(12) United States Patent
Schubert et al.

(10) Patent No.: US 9,870,130 B2
(45) Date of Patent: Jan. 16, 2018

(54) PUSHING A USER INTERFACE TO A REMOTE DEVICE

(75) Inventors: Emily Clark Schubert, San Jose, CA (US); Peter T. Langenfeld, Belmont, CA (US)

(73) Assignee: Apple Inc., Cupertino, CA (US)

( * ) Notice: Subject to any disclaimer, the term of this patent is extended or adjusted under 35 U.S.C. 154(b) by 1144 days.

(21) Appl. No.: 13/175,581

(22) Filed: Jul. 1, 2011

(65) Prior Publication Data

US 2011/0265003 A1    Oct. 27, 2011

Related U.S. Application Data

(63) Continuation-in-part of application No. 12/683,218, filed on Jan. 6, 2010, which is a continuation-in-part of application No. 12/119,960, filed on May 13, 2008.

(51) Int. Cl.
| | |
|---|---|
| *G06F 3/0482* | (2013.01) |
| *G06F 3/0484* | (2013.01) |
| *G06F 9/44* | (2006.01) |
| *G06F 3/048* | (2013.01) |
| *H04L 29/08* | (2006.01) |

(52) U.S. Cl.
CPC .......... *G06F 3/04842* (2013.01); *G06F 3/048* (2013.01); *G06F 3/0482* (2013.01); *G06F 3/0484* (2013.01); *G06F 9/4445* (2013.01); *H04L 67/025* (2013.01)

(58) Field of Classification Search
CPC ..................................................... H04L 67/025
USPC .......................................... 345/173, 1.1, 2.1
See application file for complete search history.

(56) References Cited

U.S. PATENT DOCUMENTS

| | | |
|---|---|---|
| 4,414,576 A | 11/1983 | Randmae |
| 4,924,216 A | 5/1990 | Leung |
| 5,231,872 A | 8/1993 | Bowler et al. |
| 5,727,866 A | 3/1998 | Kraines et al. |

(Continued)

FOREIGN PATENT DOCUMENTS

| | | |
|---|---|---|
| EP | 1672613 A2 | 6/2006 |
| EP | 1698518 A2 | 9/2006 |

(Continued)

OTHER PUBLICATIONS

Final Office Action dated Oct. 3, 2011 for U.S. Appl. No. 12/119,960, 13 pages.

(Continued)

*Primary Examiner* — William Boddie
*Assistant Examiner* — Leonid Shapiro
(74) *Attorney, Agent, or Firm* — Kilpatrick Townsend & Stockton, LLP

(57) ABSTRACT

A graphical user interface ("GUI") for a third-party application can be presented on accessory device that has user input and display devices. The GUI can be defined and managed by a portable media device. The portable media device can define one or more GUI image types for the third-party application. The accessory can choose one of the pre-defined GUI image types and receive a remote GUI image that conforms to the selected GUI image type from the portable media device. Alternatively, the accessory can specify the layout and contents of the GUI image that it needs, and the portable media device can generate and send a GUI image according to the accessory's specification.

12 Claims, 14 Drawing Sheets

(56) References Cited

U.S. PATENT DOCUMENTS

| | | |
|---|---|---|
| 5,774,357 A | 6/1998 | Hoffberg et al. |
| 5,991,640 A | 11/1999 | Lilja et al. |
| 5,995,106 A | 11/1999 | Naughton et al. |
| 6,012,105 A | 1/2000 | Rubbmark et al. |
| 6,052,603 A | 4/2000 | Kinzalow et al. |
| 6,078,789 A | 6/2000 | Bodenmann et al. |
| 6,127,941 A | 10/2000 | Van Ryzin |
| 6,160,551 A | 12/2000 | Naughton |
| 6,185,491 B1 | 2/2001 | Gray |
| 6,219,653 B1 | 4/2001 | O'Neill et al. |
| 6,225,984 B1 | 5/2001 | Crawford |
| 6,232,539 B1 | 5/2001 | Looney |
| 6,268,845 B1 | 7/2001 | Pariza et al. |
| 6,480,378 B2 | 11/2002 | Chang |
| 6,483,428 B1 | 11/2002 | Fish et al. |
| 6,496,927 B1 | 12/2002 | McGrane et al. |
| 6,556,219 B1* | 4/2003 | Wugofski ............. 715/762 |
| 6,642,629 B2 | 11/2003 | DeLeeuw |
| 6,694,200 B1 | 2/2004 | Naim |
| 6,772,212 B1 | 8/2004 | Lau et al. |
| 6,978,424 B2 | 12/2005 | Safadi |
| 6,983,171 B2 | 1/2006 | Van Bosch et al. |
| 7,006,793 B2 | 2/2006 | Himmel et al. |
| 7,043,572 B2 | 5/2006 | Shapiro et al. |
| 7,093,003 B2 | 8/2006 | Yuh et al. |
| 7,167,935 B2 | 1/2007 | Hellberg |
| 7,181,517 B1 | 2/2007 | Lavergne et al. |
| 7,187,947 B1 | 3/2007 | White et al. |
| 7,245,291 B2 | 7/2007 | Sharif et al. |
| 7,281,214 B2 | 10/2007 | Fadell |
| 7,293,122 B1 | 11/2007 | Schubert et al. |
| 7,299,304 B2 | 11/2007 | Saint-Hilaire et al. |
| 7,302,465 B2 | 11/2007 | Ayres et al. |
| 7,305,506 B1 | 12/2007 | Lydon et al. |
| 7,307,573 B2 | 12/2007 | Choi |
| 7,324,833 B2 | 1/2008 | White et al. |
| 7,363,129 B1 | 4/2008 | Barnicle et al. |
| 7,433,546 B2 | 10/2008 | Marriott et al. |
| 7,440,772 B2 | 10/2008 | White et al. |
| 7,450,961 B1 | 11/2008 | Heubel et al. |
| 7,486,926 B2 | 2/2009 | White et al. |
| 7,493,645 B1 | 2/2009 | Tranchina |
| 7,574,177 B2 | 8/2009 | Tupman et al. |
| 7,634,228 B2 | 12/2009 | White et al. |
| 7,765,326 B2 | 7/2010 | Robbin et al. |
| 7,834,758 B2 | 11/2010 | Peterson et al. |
| 7,987,432 B1 | 7/2011 | Grechishkin et al. |
| 8,196,044 B2 | 6/2012 | Barrett |
| 8,555,180 B2* | 10/2013 | Klask ............. 715/763 |
| 2001/0019367 A1 | 9/2001 | Walton et al. |
| 2001/0038392 A1 | 11/2001 | Humpleman et al. |
| 2002/0151327 A1 | 10/2002 | Levitt |
| 2003/0041189 A1 | 2/2003 | Choi et al. |
| 2003/0073432 A1 | 4/2003 | Meade |
| 2003/0079038 A1 | 4/2003 | Robbin et al. |
| 2003/0095211 A1 | 5/2003 | Nakajima |
| 2003/0146934 A1 | 8/2003 | Bailey et al. |
| 2003/0154291 A1* | 8/2003 | Ocheltree et al. ......... 709/228 |
| 2004/0028295 A1* | 2/2004 | Allen et al. ............. 382/313 |
| 2004/0049475 A1* | 3/2004 | Kidokoro ............. 707/1 |
| 2004/0179848 A1 | 9/2004 | Belenkii |
| 2004/0216058 A1* | 10/2004 | Chavers et al. ......... 715/810 |
| 2004/0242269 A1 | 12/2004 | Fadell |
| 2004/0249994 A1 | 12/2004 | Shapiro et al. |
| 2005/0014531 A1* | 1/2005 | Findikli ............. 455/557 |
| 2005/0034158 A1 | 2/2005 | DeLaVega |
| 2005/0146616 A1 | 7/2005 | Parulski et al. |
| 2005/0222875 A1* | 10/2005 | Lordeman et al. ......... 705/3 |
| 2005/0237821 A1 | 10/2005 | Dekker et al. |
| 2006/0036356 A1 | 2/2006 | Rasin et al. |
| 2006/0088228 A1 | 4/2006 | Marriott et al. |
| 2006/0226298 A1* | 10/2006 | Pierson ............. 246/1 R |
| 2006/0280447 A1 | 12/2006 | Ozaki |
| 2006/0288036 A1* | 12/2006 | Sadovsky et al. ........ 707/102 |
| 2007/0016362 A1 | 1/2007 | Nelson |
| 2007/0043550 A1 | 2/2007 | Tzruya |
| 2007/0049197 A1 | 3/2007 | Klein |
| 2007/0080823 A1 | 4/2007 | Fu et al. |
| 2007/0126604 A1 | 6/2007 | Thacher |
| 2007/0201705 A1* | 8/2007 | Dorogusker et al. ......... 381/104 |
| 2007/0206827 A1 | 9/2007 | Tupman et al. |
| 2007/0225048 A1 | 9/2007 | Kojima et al. |
| 2007/0240029 A1 | 10/2007 | Kitada et al. |
| 2008/0089508 A1 | 4/2008 | Lee |
| 2008/0151126 A1 | 6/2008 | Yu |
| 2008/0184269 A1 | 7/2008 | Avery et al. |
| 2008/0244426 A1 | 10/2008 | Klask |
| 2009/0195513 A1* | 8/2009 | Dybalski et al. ............. 345/173 |
| 2009/0248802 A1 | 10/2009 | Mahajan et al. |
| 2009/0254839 A1 | 10/2009 | Kripalani et al. |
| 2009/0254960 A1 | 10/2009 | Yarom et al. |
| 2009/0284476 A1 | 11/2009 | Bull et al. |
| 2010/0088634 A1 | 4/2010 | Tsuruta et al. |
| 2010/0293462 A1 | 11/2010 | Bull et al. |
| 2011/0138295 A1 | 6/2011 | Momchilov et al. |
| 2011/0145863 A1 | 6/2011 | Alsina et al. |
| 2011/0246891 A1 | 10/2011 | Schubert et al. |

FOREIGN PATENT DOCUMENTS

| | | |
|---|---|---|
| JP | 06-275059 A | 9/1994 |
| JP | 11-003314 A | 1/1999 |
| JP | 11-020556 A | 1/1999 |
| JP | 11-260045 A | 9/1999 |
| JP | H11328081 A | 11/1999 |
| JP | 2000-082039 | 3/2000 |
| JP | 2000312391 A | 11/2000 |
| JP | 2001092575 A | 4/2001 |
| JP | 2001-142618 | 5/2001 |
| JP | 2002-215483 A | 8/2002 |
| JP | 2004-030631 | 1/2004 |
| JP | 2004-121592 | 4/2004 |
| JP | 2004-172695 A | 6/2004 |
| JP | 2004194011 A | 7/2004 |
| JP | 2005-074211 | 3/2005 |
| JP | 2006-115098 | 4/2006 |
| JP | 2006-236323 | 9/2006 |
| JP | 2006-321470 | 11/2006 |
| JP | 3131798 U | 4/2007 |
| JP | 2007110629 A | 4/2007 |
| JP | 2010130669 A | 6/2010 |
| KR | 10-2004-0094347 A | 11/2004 |
| KR | 2005-0072069 A | 7/2005 |
| WO | WO 00/60450 A1 | 10/2000 |
| WO | 2006/040951 A1 | 4/2006 |
| WO | WO 2009/036366 A1 | 3/2009 |
| WO | WO 2009/140095 A2 | 11/2009 |

OTHER PUBLICATIONS

Non-Final Office Action dated Jul. 13, 2011 for U.S. Appl. No. 12/683,218, 11 pages.
Non-Final Office Action and Interview Summary dated Jun. 8, 2011 for U.S. Appl. No. 12/119,960, 14 pages.
Restriction Requirement dated Apr. 28, 2011 for U.S. Appl. No. 12/683,218, 4 pages.
Non-Final Office Action dated Mar. 14, 2011 for U.S. Appl. No. 12/119,960, 13 pages.
Restriction Requirement dated Feb. 7, 2011 for U.S. Appl. No. 12/119,960, 4 pages.
International Search Report dated Dec. 23, 2009 for PCT Patent Application No. PCT/US2009/042728, 6 pages.
International Preliminary Report on Patentability with Written Opinion dated Dec. 23, 2009 for PCT Patent Application No. PCT/US2009/042728, dated Nov. 17, 2010, 8 pages.
Combined Search and Examination Report dated Aug. 13, 2009 for Great Britain Application No. GB0907592.0, 6 pages.
MAXTech Technology Ltd., "MaxTech's full range of MP3 Digital Audio Products (Portables, Stand-alone Players and Car HiFi System) created big interest during the show Jan. 6-9, 2000", CES 2000/Las Vegas, 2 pages. Retrieved from the Internet at http://web.

(56) References Cited

OTHER PUBLICATIONS archive.org/web/20000930170634/www.maxtech.com.hk/t-details.htm> on Sep. 26, 2008, 2 pages.
MAXTech Technology Ltd., DA-CS15G, Retrieved from the Internet at http://web.archive.org/web/20010223230441/www.maxtech.com.hk/g-p06.htm> on Sep. 23, 2008, 2 pages.
Neuros: Product Detail, Neuros 128 MB MP3 Digital Audio Computer, Retrieved from http://www.neurosaudio.com on Apr. 9, 2003, 6 pages.
"Parrot Launches New Premium Line of Hands-Free Bluetooth, Music Kits with iPod/iPhone Integration Now, Drive and Talk Hands-Free While Listening to your MP3s Through the Car's Sound System", Retrieved from the Internet on Jun. 8, 2009 at http://press.parrot.com/press.php?id_communique=83&langue=usa, 11 pages.
JP Office Action (English Translation] dated Dec. 24, 2013 in JP2012-202681, 4 pages.
Office Action dated Jan. 2, 2014 in U.S. Appl. No. 13/032,614, 30 pages.
Office Action dated Mar. 20, 2014 in U.S. Appl. No. 13/161,339, 38 pages.
Office Action dated Mar. 26, 2014 in U.S. Appl. No. 12/119,960, 12 pages.
Office Action dated Jul. 22, 2014 in Korean Patent Application No. 10-20127031480, 5 pages.
Office Action dated Jul. 1, 2014 in U.S. Appl. No. 14/222,302, 29 pages.
Office Action dated Jun. 19, 2014 in U.S. Appl. No. 13/032,614, 24 pages.
Office Action dated Sep. 22, 2014 (English Translation) in Japanese Patent Application No. 2012-202681, 4 pages.
Office Action dated Nov. 27, 2014 in Korean Patent Application No. 10-2014-7014708, 7 pages.
Office Action dated Nov. 20, 2014 in U.S. Appl. No. 12/119,960, 13 pages.
Office Action dated Dec. 10, 2014 in U.S. Appl. No. 14/222,302, 34 pages.
Office Action dated Mar. 25, 2015 in U.S. Appl. No. 13/161,339, 48 pages.
Office Action (English Translation) dated Mar. 22, 2015 in Korean Patent Application No. 10-2012-7031480, 6 pages.
Examination Report dated Jan. 30, 2015 in Australian Patent Application No. 2013200021, 3 pages.
Notice of Allowance dated Apr. 27, 2015 for U.S. Appl. No. 14/039,557, 15 pages.
Final Office Action dated May 18, 2015 for U.S. Appl. No. 12/683,218, 11 pages.
Notice of Allowance dated Sep. 30, 2015 for U.S. Appl. No. 14/224,830, 13 pages.
Notice of Allowance dated Nov. 5, 2015 for U.S. Appl. No. 14/226,705, 13 pages.
Notice of Allowance dated Nov. 6, 2015 for U.S. Appl. No. 14/222,302, 11 pages.
Non-Final Office Action dated Nov. 4, 2015 for U.S. Appl. No. 12/119,960, 11 pages.
Examination Report dated Nov. 26, 2015 in Indian Patent Application No. 4249/KOLNP/2010, 2 pages.
Notice of Allowance dated Jan. 25, 2016 in U.S. Appl. No. 14/224,830. 16 pages.
Non-Final Office Action dated Jan. 29, 2016 in U.S. Appl. No. 12/683,218. 18 pages.
Notice of Allowance dated Jun. 17, 2016 for U.S. Appl. No. 14/226,705. 15 pages.
Final Office Action dated Oct. 7, 2016 for U.S. Appl. No. 12/683,218, 11 pages.
Non-Final Office Action dated Nov. 9, 2016 in U.S. Appl. No. 14/517,579, 10 pages.
Office Action (English Translation) for Chinese Patent Application No. 201310723831.7, dated Nov. 7, 2016, 7 pages \* cited by examiner

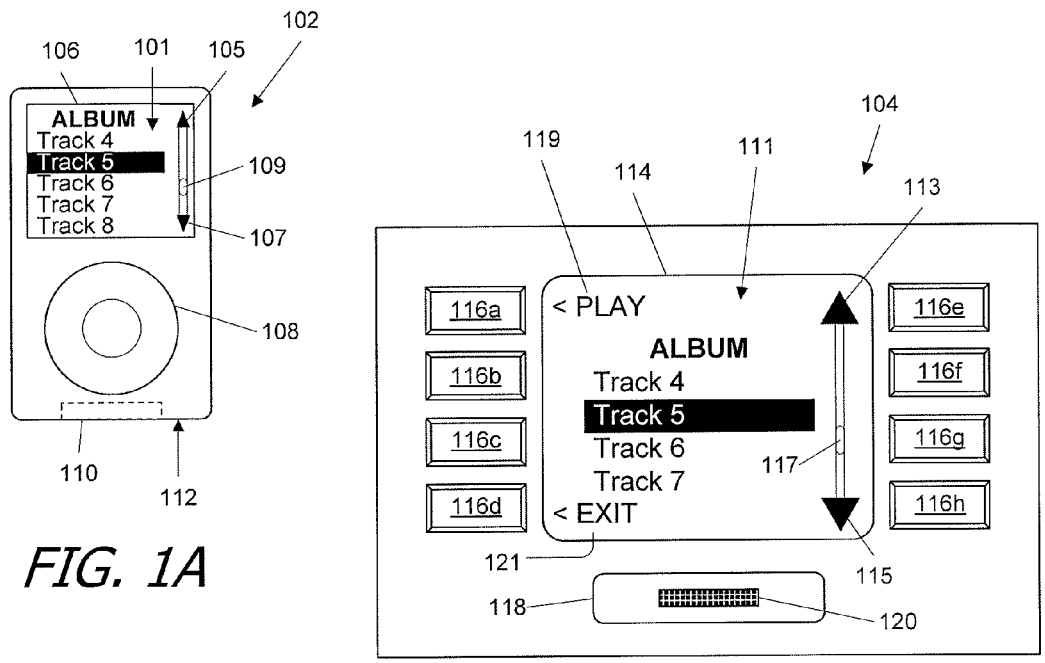
FIG. 1A
FIG. 1B
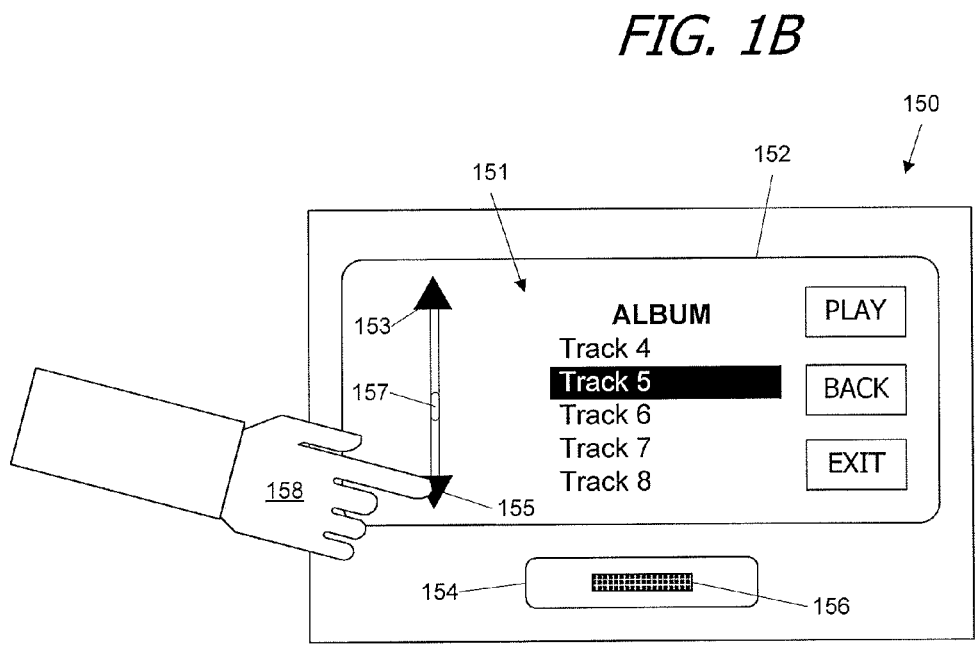
FIG. 1C

| COMMAND | DIRECTION | PAYLOAD |
|---|---|---|
| SetDisplayInfo | A → P | Display descriptor(s) |
| SetControlInfo | A → P | Input control descriptor(s) |
| SetEnvInfo | A → P | Environment descriptor(s) |
| SetEnvImage | A → P | Image element |
| SetStatusInfo | A → P | Status descriptor(s) |
| RemoteGUIImageData | P → A | Pixels to display |
| ProcessUserInput | A → P | Control operation information |
| EnterRemoteGUIMode | A→P / P→A | none |
| ExitRemoteGUIMode | A→P / P→A | none |

*FIG. 3*

| COMMAND | DIRECTION | PAYLOAD |
|---|---|---|
| AccessorySettings | A → P | Token; descriptor |
| GetPMDOptions | A → P | Selector: Supported or Active |
| RetPMDOptions | P → A | Coded field indicating options |
| SetPMDOptions | A → P | Coded field indicating options |
| BrightnessAdjust | A → P | Desired brightness |
| SetStatusInfo | A → P | Event indicator |
| ButtonInput | A → P | Control identifier; action |
| RotationInput | A → P | Control identifier; action |
| TouchInput | A → P | Control identifier; action |
| GetUIMode | A → P | none |
| RetUIMode | P → A | Mode identifier |
| SetUIMode | A → P | Mode identifier |

*FIG. 4*

PUSHING A USER INTERFACE TO A REMOTE DEVICE

CROSS-REFERENCE TO RELATED APPLICATION

This application is a continuation-in-part of U.S. application Ser. No. 12/683,218 filed Jan. 6, 2010, which is a continuation-in-part of U.S. application Ser. No. 12/119,960 filed May 13, 2008, entitled "Pushing a User Interface to a Remote Device," the disclosures of both the applications are incorporated by reference herein in their entirety.

FIELD OF THE INVENTION

The present invention relates generally to accessories for portable media devices and in particular to allowing a portable media device to provide a user interface for controlling the media device to an accessory.

BACKGROUND OF THE INVENTION

Portable media devices allow users to store media content (music, videos, photos, audiobooks, etc.) and access stored media content from nearly anywhere. Some portable media devices also allow users to connect other devices (referred to herein as "accessories" or "accessory devices") to the portable media device, thereby enhancing some aspect of the portable media device's operation. For example, most portable media devices provide a headphone jack for listening to audio content. Some accessories provide speakers, thus allowing the user to share the sound with others, or to listen in environments where use of headphones might not be feasible (such as while driving).

In some instances, an accessory can be used to control operation of a portable media device; such accessories are referred to herein as "remote control devices." The remote control device can send commands to the portable media device indicating a user-requested operation (such as starting or pausing playback, skipping to the next track, returning to a previous track, fast-forward or rewind within a track, etc.). The portable media device can execute the requested operation, thus allowing the user to operate the portable media device without touching the portable media device. Such remote control operation can be particularly useful in situations where it is inconvenient for a user to manipulate the portable media device's interface directly. For example, portable media devices tend to be small, with relatively small controls and display screens. Thus, it can be difficult for a user to operate such a device while driving or from across a room.

Some remote control devices provide a graphical user interface (GUI) and allow the user to perform more advanced functions such as browsing a database of stored content, selecting content to play, etc. For instance, Johnson Controls International has been developing a "Mobile Device Gateway" for use in vehicles; the system includes a connection point for a portable media device and a console that provides an audio/visual interface. But existing remote GUIs are defined and controlled by the remote control device, and consequently, they may bear little resemblance to a GUI supplied by the portable media device itself. Certain functions available on the portable media device (such as browsing or searching a database, adjusting playback settings, etc.) may be unavailable or difficult to find. Thus, a user may not be able to perform desired functions. Further, GUIs provided for the same portable media device by different remote control devices might be quite different, and the user who connects a portable media device to different accessories with remote control may find the inconsistencies frustrating.

It would, therefore, be desirable to provide a more consistent remote user interface experience.

BRIEF SUMMARY OF THE INVENTION

Embodiments of the present invention relate to providing a graphical user interface ("GUI") on a remote control accessory device, where the GUI can be defined and managed by a portable media device rather than the accessory device. The accessory device can provide a combination of user input and visual feedback devices, such as a video screen for presenting information and feedback to a user, along with buttons, knobs, touchscreen and/or touchpad for receiving user input. The portable media device can provide the accessory with an image (referred to herein as a "remote" GUI image) to be displayed on the video screen; the image can include various user interface elements that can resemble or replicate a "native" GUI provided directly on the portable media device. The accessory can send information to the portable media device indicative of a user action taken in response to the displayed image; such information can indicate, for example, that a particular button was pressed or that a particular portion of a touch-sensitive display screen was touched by the user. The portable media device can process this input to identify the action requested by the user and take the appropriate action. The action may include providing to the accessory an updated GUI image to be displayed, where the updated GUI image reflects the user action.

In some embodiments, a portable media device can supports a number of different functionalities (e.g., audio playback, video playback, still image playback, telephone, World Wide Web browser, maps and navigation, etc.), and an accessory can use the remote GUI to access any or all of these functionalities. The set of functionalities accessible via the remote GUI can be determined by the portable media device or the accessory. In one embodiment, the accessory can specify which of the functionalities supported by the portable media device should be made available via the remote GUI. In another embodiment, the portable media device can make the selection. In either case, the selection can be based in part on information about the operating environment or status of the accessory.

The following detailed description together with the accompanying drawings will provide a better understanding of the nature and advantages of the present invention.

BRIEF DESCRIPTION OF THE DRAWINGS

FIG. 1A illustrates a portable media device, and FIGS. 1B and 1C illustrate accessory devices with remote graphical user interfaces for the portable media device of FIG. 1A according to embodiments of the present invention.

FIG. 3 is a table of commands usable to implement a remote graphical user interface ("GUI") according to an embodiment of the present invention.

FIG. 4 is a table of commands usable to implement a remote GUI according to another embodiment of the present invention.

DETAILED DESCRIPTION OF THE INVENTION

Figure 2:
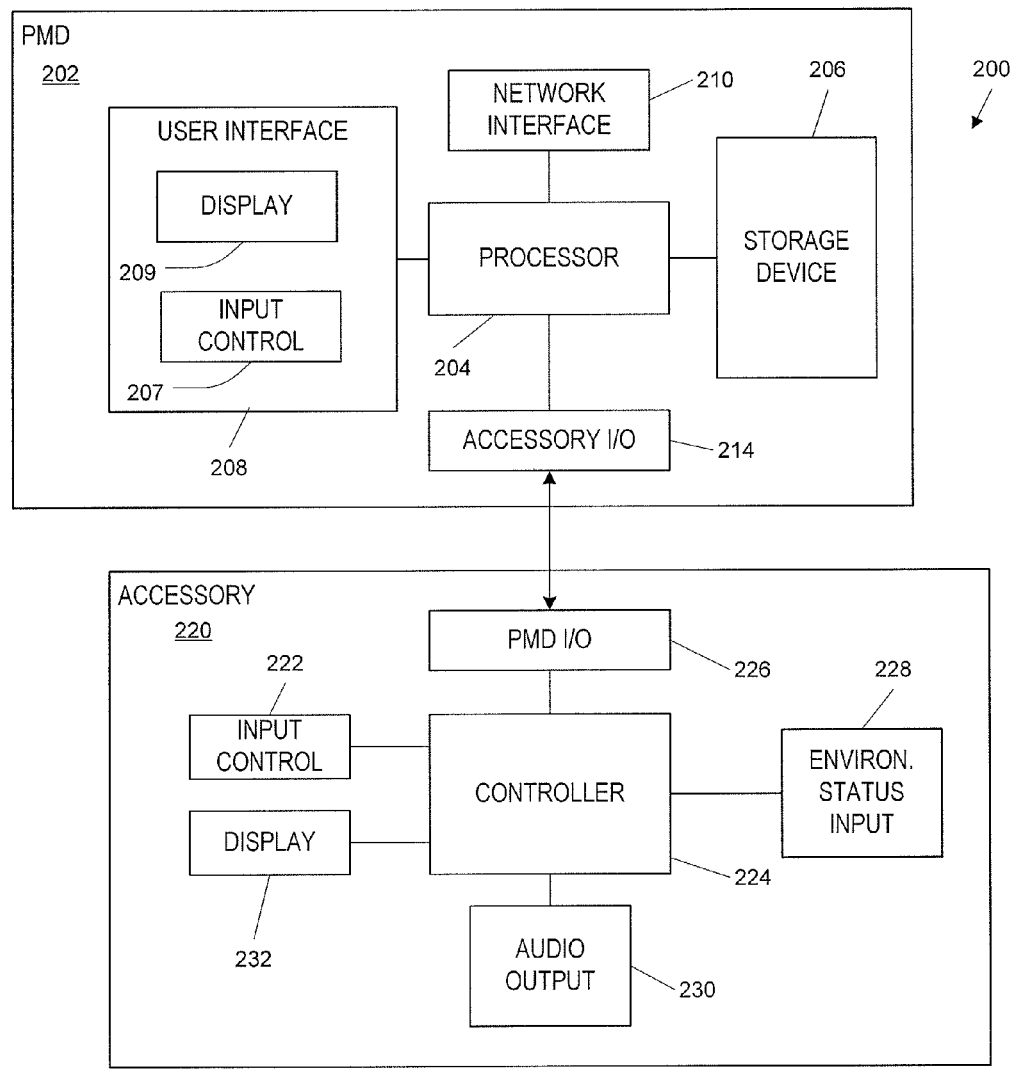
FIG. 2 is a block diagram of a system including a portable media device and an accessory according to an embodiment of the present invention.

Embodiments of the present invention relate to providing a graphical user interface ("GUI") on a remote control accessory device that is defined and managed by a portable media device rather than the accessory device. The accessory device provides a combination of user input and visual feedback devices, such as a video screen for presenting information and feedback to a user, along with buttons, knobs, touchscreen and/or touchpad for receiving user input. The portable media device can provide the accessory with an image to be displayed on the video screen; the image can include various user interface elements that can resemble or replicate the GUI provided directly on the portable media device. The accessory can send information to the portable media device indicative of a user action taken in response to the displayed image; such information can indicate, for example, that a particular button was pressed or that a particular portion of a touch-sensitive display screen was touched by the user. The portable media device can process this input to identify the action requested by the user and take the appropriate action. The action may include providing to the accessory an updated GUI image to be displayed, where the updated GUI image reflects the user action.

FIGS. 1A and 1B show portable media device ("PMD") 102 and accessory 104 according to an embodiment of the present invention. In FIG. 1A, PMD 102 has a user interface that can include display screen 106 and user input device 108 (e.g., a click wheel as found on certain iPod™ media players manufactured and sold by Apple Inc., assignee of the present application). Display screen 106 can present a GUI image to the user, and the user can interact with the GUI image by operating user input device 108. Thus, for example, the user can navigate a database of stored media content, select one or more media assets to be played, control playback, and adjust settings of PMD 102. The interface provided by display screen 106 and input device 108 is referred to herein as the "native GUI" of PMD 102.

FIG. 1A shows an example of a native GUI image that can be displayed by one embodiment of PMD 102. In this example, native GUI image 101 includes an album name ("ALBUM") at the top and a listing of tracks beneath. A currently selected track ("Track 5") is highlighted. Up and down arrows 105, 107 indicate that scrolling to view additional tracks is possible, and a slider element 109 indicates the approximate position of the currently selected track within the list of tracks.

PMD 102 also has a connector 110 disposed on its bottom surface 112. Connector 110 provides a mechanical and electrical coupling to other devices.

Referring to FIG. 1B, accessory device (also referred to as "accessory") 104 can be an in-vehicle media control unit that can be installed in a dashboard of a vehicle such as an automobile, on a vehicle seat back (e.g., in an automobile or airplane), or elsewhere. Accessory 104 can include display 114 and buttons 116a-h arranged near the edges of display 114. Buttons 116 can provide "soft keys" whose function can be interpreted by accessory 104 based on what is currently displayed on display 114.

In operation, accessory 104 can play media content. For example, accessory 104 can display video content on display 114 and/or deliver the video content to another display device (e.g., on the back of a driver or passenger seat). Accessory 104 can deliver audio content to the vehicle's speaker system. Accessory 104 can also provide control for other functionality; for example, accessory 104 may provide environmental controls (heater, air conditioning); navigation-related controls (interactive maps, driving directions); controls for a radio tuner, DVD player, or the like; and so on.

Accessory 104 can also include a docking bay 118 adapted to receive PMD 102. For example, docking bay 118 can be sized and shaped to receive at least the bottom portion of PMD 102 and can include a connector 120 that mates with connector 110 of PMD 102, thereby allowing electrical signals to be transmitted back and forth between PMD 102 and accessory 104. In an alternative embodiment, PMD 102 and accessory 104 can each be equipped with a wireless communication interface (e.g., an interface implementing Bluetooth standards), thereby allowing the two devices to exchange information without a direct physical connection being made.

In accordance with an embodiment of the present invention, when PMD 102 of FIG. 1A is connected to accessory 104 of FIG. 1B, accessory 104 can enter a "remote GUI" operating mode. In this operating mode, PMD 102 can provide a GUI image to accessory 104. Accessory 104 can display the image on display 114. This remote GUI image can be displayed as received, without modification by accessory 104, thereby allowing PMD 102 to control the look of the interface. In some embodiments, PMD 102 provides a remote GUI image that replicates the native GUI of PMD 102. In other embodiments, PMD 102 can provide a remote GUI image that conforms to a modified version of the native GUI. For example, the modified GUI may use different fonts or color schemes, or may include additional or different control options.

In FIG. 1B, display 114 of accessory 104 displays an example remote GUI image 111. Like native GUI image 101 shown in FIG. 1A, remote GUI image 111 includes an album name ("ALBUM") at the top and a listing of tracks beneath. A currently selected track ("Track 5") is highlighted. Up and down arrows 113, 115 indicate that scrolling to view additional tracks is possible, and a slider element 117 indicates the approximate position of the currently selected track within the list of tracks. Up arrow 113 and down arrow 115 are placed adjacent to buttons 116e and 116h, respectively, thereby indicating that button 116e can be used to move up the list while button 116h can be used to move down the list. As described below, the mapping of operations to buttons 116a-h can be determined by PMD 102. When a user presses one of buttons 116a-h, accessory 104 can send to PMD 102 a signal indicating which of buttons 116a-h was pressed. PMD 102 can interpret the signal and take appropriate action. The action may include updating the remote GUI image, starting or pausing playback, modifying a setting or instructing accessory 104 to modify a setting, etc.

Remote GUI image 111 on display 114 of accessory 104 can also include additional elements not found on native GUI image 101. For example, remote GUI image 111 includes GUI elements indicating a "Play" operation (element 119) and an "Exit" operation (element 121). Elements 119 and 121 are positioned next to buttons 116a and 116d, respectively, to indicate that the corresponding operations can be invoked by pressing the adjacent button. In this example, the user can press button 116a to indicate that the currently selected track should be played. The user can press button 116d to indicate that accessory 104 should exit the remote GUI mode, allowing the user to access other functionality (e.g., navigation, climate control, etc.). Interfaces for such other functionality might or might not also be controlled by PMD 102. In some embodiments, exiting the remote GUI mode does not disconnect accessory 104 from PMD 102; for example, PMD 102 and accessory 104 can continue playing a media track while the other functionality of accessory 104 is accessed.

FIG. 1C illustrates accessory 150 according to another embodiment of the present invention. Like accessory 104, accessory 150 can be an in-vehicle media control unit. Accessory 150 includes display 152 and docking bay 154 adapted to receive a PMD such as PMD 102 of FIG. 1A. In this example, docking bay 154 includes a connector 156 that mates with connector 110 of PMD 102, thereby allowing electrical signals to be transmitted back and forth between PMD 102 and accessory 150. In an alternative embodiment, PMD 102 and accessory 150 can each be equipped with a wireless communication interface (e.g., an interface implementing Bluetooth standards), thereby allowing the two devices to exchange information without a direct physical connection being made.

Display 152 of accessory 150 has a touch-sensitive overlay such that when a user touches a portion of display 152, the touched portion can be identified, e.g., using (x, y) pixel coordinates. A user can touch an element of the displayed GUI image to select an action to be taken, as suggested by hand 158. In other embodiments, the touch-sensitive overlay of display 152 can also detect finger motions such as dragging along the surface, or opening or closing fingers.

Like accessory 104 of FIG. 1B, when PMD 102 is connected to accessory 150, accessory 150 can enter a remote GUI operating mode and can display a remote GUI image 151 provided by PMD 102. Like remote GUI image 111 in FIG. 1B, remote GUI image 151 can be a modified version of native GUI image 101 of FIG. 1A. Remote GUI image 151 includes an album name ("ALBUM") at the top and a listing of tracks beneath. A currently selected track ("Track 5") is highlighted. Up and down arrows 153, 155 indicate that scrolling to view additional tracks is possible, and a slider element 157 indicates the approximate position of the currently selected track within the list of tracks. In this instance, the user can touch an area of the screen to select the corresponding action. Thus, for example, as shown in FIG. 1C, the user (hand 158) can touch down arrow 155 to advance the selection through the list (e.g., from "Track 5" to "Track 6").

Remote GUI image 151 can also include additional elements not found on native GUI image 101. For example, remote GUI image 151 includes GUI elements indicating a "Play" operation (element 159), a "Back" operation (element 161), and an "Exit" operation (element 163). In this example, the user can touch "Play" element 159 to indicate that the currently selected track should be played. The user can touch "Back" element 161 to navigate backward in the database hierarchy (e.g., to a list of albums from which the currently displayed album was selected). The user can touch "Exit" element 163 to indicate that accessory 150 should exit the remote GUI mode, allowing the user to access other functionality (e.g., navigation, climate control, etc.). As noted above, interfaces for such other functionality might not be controlled by PMD 102. Also as noted above, exiting the remote GUI mode need not disconnect accessory 150 from PMD 102; for example, PMD 102 and accessory 150 can continue playing a media track while the other functionality is accessed.

As described below, the mapping of GUI elements to screen areas can be determined by PMD 102. When a user touches a portion of display screen 152, accessory 154 can simply send to PMD 102 a signal indicating which portion of the screen was touched (e.g., pixel coordinates of the touched location). PMD 102 can interpret the signal and take appropriate action. The appropriate action may include updating the remote GUI image, starting or pausing playback, modifying a setting or instructing accessory 104 to modify a setting, etc.

At different times, PMD 102 of FIG. 1A can be coupled to different accessories. Thus, for example, at one time PMD 102 can be coupled to accessory 104 of FIG. 1B and can provide a remote GUI suitable for use with an interface where the user input devices are buttons 116a-h. At a different time, PMD 102 can be coupled to accessory 150 of FIG. 1C and can provide a remote GUI suitable for use with a touchscreen interface. Because the remote GUI is under the control of PMD 102, a user can interact with PMD 102 directly or through various accessories and experience a generally consistent interface from one configuration to the next. Such consistency can help to make the use of different interfaces, as well as the transition from one accessory to another, more intuitive for the user.

It will be appreciated that the systems of FIGS. 1A-1C are illustrative and that variations and modifications are possible. A variety of portable media devices may be used, not limited to PMD 102, and the native GUI may vary from one device to the next. For instance, some PMDs may provide touch-screen interfaces, graphic representations of content listings (e.g., incorporating images of album covers), animated GUI images, or other features not specifically illustrated herein. Some PMDs may also incorporate other functionality in addition to media asset storage, search, and playback. Examples include personal information management (e.g., calendar, contacts); telephony (e.g., via mobile phone network); Internet connectivity (e.g., via wireless communication protocols such as the IEEE 802.11 family of standards (also known as "WiFi") and/or wireless data networks such as 3G or EDGE); maps and navigation; execution of application programs (including third-party application programs loaded onto the PMD by a user); and so on. The PMD may provide remote GUI interactivity for any or all of its functions, and the combination of functions available may vary depending on the accessory. (For example, to avoid driver distraction, it might be desirable to disable Internet browsing or video playback in a moving automobile.)

A remote GUI mode can be provided in a variety of accessories. For example, in addition to in-vehicle systems, a PMD interface with remote GUI can be provided in a console on an exercise machine (such as a treadmill, stationary bicycle, or the like), in an in-flight entertainment console of a commercial or private airplane, in a home entertainment system incorporating a video device such as a television (e.g., using a set top box or an integrated component of the video display device to provide an interface to the PMD), and so on.

FIG. 2 is a block diagram of system 200 according to an embodiment of the present invention. System 200 can include PMD 202 (e.g., implementing PMD 102 of FIG. 1A) and accessory 220 (e.g., implementing accessory 104 of FIG. 1B or accessory 150 of FIG. 1C).

PMD 202 in this embodiment can provide media player capability. PMD 202 can include processor 204, storage device 206, user interface 208, network interface 210 and accessory input/output (I/O) interface 214. Processor 204 in this embodiment can be a programmable processor that executes programs to implement operations such as playback of media tracks and browsing a database of stored media assets, as well as a native GUI to provide user control over the implemented operations. Processor 204 can also implement a remote GUI program that generates remote GUI images for accessory 220 and processes user input forwarded by accessory 220, as described below.

Storage device 206 may be implemented, e.g., using disk, flash memory, or any other non-volatile storage medium. In some embodiments, storage device 206 can store a database of media assets (also referred to herein as "tracks"), such as audio, video, still images, or the like, that can be played by PMD 202, together with metadata descriptive of each track. Metadata can include, e.g., a media type (audio track, video track, audio book, still image, etc.); an asset title; a name of an artist or performer associated with the asset; composer or author information; asset length; chapter information; album information; lyrics; information about associated artwork or images; description of the asset; and so on. Other information, including programs to be executed by processor 204, can be stored in storage device 206.

User interface 208 may include one or more input controls 207 such as a touch pad, touch screen, scroll wheel, click wheel, dial, button, keypad, microphone, or the like, as well as display screen 209. Other components, such as an audio output section (not explicitly shown) can also be included. A user can view native GUI images generated by processor 204 on display screen 209 and can operate input controls 207 based on the displayed image to invoke the functionality of PMD 202. Processor 204 can process the user input and take appropriate action, including updating the native GUI image on display screen 209. Thus, user interface 208 and processor 204 can provide a native GUI for PMD 202.

Network interface 210 can be operated under control of processor 204 to connect PMD 202 to various communication networks, including voice and data networks. For example, network interface 210 can provide local area network connections via WiFi, mobile telephony via suitable RF circuitry, access to wireless data networks including 3G and EDGE networks, personal area connections via Bluetooth, or the like. In some embodiments, network interface 210 can provide wired connections in addition to or instead of wireless connections.

Accessory I/O interface 214 can allow PMD 202 to communicate with various accessories. For example, accessory I/O interface 214 can support connections to such accessories as an in-vehicle media system or the like. In one embodiment, accessory I/O interface 214 includes a 30-pin connector corresponding to the connector used on iPod™ products manufactured and sold by Apple Inc. or one or more other connectors, such as a Universal Serial Bus ("USB") or FireWire connector. Alternatively or additionally, accessory I/O interface 214 can include a wireless interface (e.g., Bluetooth or the like). Accessory I/O interface 214 can allow PMD 202 to communicate with accessory 220 or another accessory.

Accessory 220 includes controller 224, one or more input controls 222, display 232, PMD I/O interface 226, environmental and status input interface 228, and audio output section 230. Controller 224 can include, e.g., a microprocessor or microcontroller executing program code to perform various functions such as digital audio decoding, analog or digital audio and/or video processing, and the like. Input controls 222 can include, e.g., a touch pad, touch screen, scroll wheel, click wheel, dial, button, keypad, microphone, or the like. Display 232 can be used to present operational or control information as well as video content to the user; in some embodiments, display 232 can be implemented as a multi-screen display system, and the images shown on different screens might be the same or different. Thus, for example, one screen can be used for operational or control information while another screen is used for presenting video content. In still other embodiments, operational or control information can be overlaid or composed with video content, allowing a user to view both simultaneously on the same screen.

Accessory 220 can be operable in a "local GUI" mode as well as a remote GUI mode. In the local GUI mode, controller 224 can generate GUI images to be displayed on display 232 and can receive and process user input from input controls 222, thereby allowing a user to control various operations of accessory 220. In the remote GUI mode, GUI images can be generated by processor 204 of PMD 202, delivered via accessory I/O interface 214 and PMD I/O interface 226 to controller 224, and displayed on display 232. Controller 224 can detect user operation of input controls 222 and send corresponding signals to PMD 202 via PMD I/O interface 226 and accessory I/O interface 214. Processor 204 of PMD 202 can process the signals to determine what action the user has requested; depending on the user request, processor 204 can generate an updated remote GUI image to be displayed by display 232, generate other instructions to controller 224, or invoke other operations of PMD 202 (such as beginning or ending playback, searching the database of stored assets, etc.).

Audio output device 230, which can be implemented, e.g., as one or more integrated circuits, provides the capability to output audio. For example, audio output device 230 can include one or more speakers or driver circuits and connectors for external speakers, thereby enabling audio to be presented to a user. In one embodiment, controller 224 can receive audio signals from PMD 202 via PMD I/O interface 226 and can provide the signals with or without further processing to audio output device 230; audio output device 230 can transform the signals as appropriate for presentation to the user.

Environmental and status input interface 228 can include communication pathways to other systems of the equipment in which accessory 220 is installed, allowing these systems to provide accessory 220 with information about the operating environment and/or status. For example, if accessory 220 is installed in an automobile, environmental status input interface 228 may receive information indicating whether the automobile's headlights are on or off, what gear the vehicle is currently in, whether a parking brake is engaged, current vehicle speed, etc. If accessory 220 is installed in an exercise machine, environmental status input interface 228 may receive information indicating whether the machine is in use and information about the current status of a workout when one is in progress. Accessory 220 can provide this information to PMD 202, and PMD 202 can use the information to customize the remote GUI images and functionality to the operating environment, as described below.

Accessory 220 can be any accessory that provides a display and one or more associated user input controls. Examples include in-vehicle media units that can be mounted, e.g., in a dashboard or seat back, consoles that may be provided on exercise equipment, airplane in-flight entertainment systems (e.g., mounted in a seatback, armrest, or console unit), home entertainment systems, and so on. In one embodiment, PMD I/O interface 226 includes a 30-pin connector that mates with the connector used on iPod™ products manufactured and sold by Apple Inc. PMD I/O interface 226 can also include other types of connectors, e.g., Universal Serial Bus (USB) or FireWire connectors. Alternatively, PMD I/O interface 226 can include a wireless interface (e.g., Bluetooth or the like).

It will be appreciated that the system configurations and components described herein are illustrative and that variations and modifications are possible. The PMD and/or accessory may have other capabilities not specifically described herein. For example, the PMD can include any combination of computing and/or communication functionalities in addition to media playback capability. Examples of other functionalities that can be provided by a PMD include personal information management (e.g., calendar, contacts); telephony (e.g., via mobile phone network); Internet connectivity (e.g., via wireless communication protocols such as WiFi and/or wireless data networks such as 3G or EDGE); maps and navigation (e.g., using a Global Positioning System ("GPS") receiver; execution of application programs (including third-party application programs that may be loaded onto the PMD by a user); and so on.

Further, while the PMD and accessory are described herein with reference to particular blocks, it is to be understood that these blocks are defined for convenience of description and are not intended to imply a particular physical arrangement of component parts. Further, the blocks need not correspond to physically distinct components. Embodiments of the present invention can be realized in a variety of devices including electronic devices implemented using any combination of circuitry and software.

Accessory I/O interface 214 of PMD 202 and PMD I/O interface 226 of accessory 220 allow PMD 202 to be connected to accessory 220 and subsequently disconnected from accessory 220. As used herein, PMD 202 and accessory 220 are "connected" whenever a communication channel between accessory I/O interface 214 and PMD I/O interface 226 is open and are "disconnected" whenever the communication channel is closed. Connection can be achieved by physical attachment (e.g., between respective mating connectors of PMD 202 and accessory 220), by an indirect connection such as a cable, or by establishing a wireless communication channel. Similarly, disconnection can be achieved by physical detachment, disconnecting a cable, powering down accessory 220 or PMD 202, or closing the wireless communication channel. Thus, a variety of communication channels may be used, including wired channels such as USB, FireWire, or universal asynchronous receiver/transmitter ("UART"), or wireless channels such as Bluetooth.

Regardless of the particular communication channel, as long as PMD 202 and accessory 220 are connected to each other, the devices can communicate by exchanging commands and data according to a protocol. The protocol defines a format for sending messages between PMD 202 and accessory 220. For instance, the protocol may specify that each message is sent in a packet with a header and an optional payload. The header provides basic information (e.g., a start indicator, length of the packet, and a command to be processed by the recipient), while the payload provides any data associated with the command; the amount of associated data can be different for different commands, and some commands may provide for variable-length payloads. In some embodiments, the commands may be defined such that a particular command is valid in only one direction. The packet can also include error-detection or error-correction codes as known in the art.

The protocol can define a number of "lingoes," where a "lingo" is a group of related commands that can be supported (or unsupported) by various classes of accessories. In one embodiment, a command can be uniquely identified by a first byte identifying the lingo to which the command belongs and a second byte identifying the particular command within the lingo. Other command structures may also be used. It is not required that all accessories, or all PMDs to which an accessory can be connected, support every lingo defined within the protocol.

In some embodiments, every accessory 220 and every PMD 202 that are designed to be interoperable with each other support at least a "general" lingo that includes commands common to all such devices. The general lingo can include commands enabling the PMD and the accessory to identify and authenticate themselves to each other and to provide general information about their respective capabilities, including which (if any) other lingoes each supports. The general lingo can also include authentication commands that the PMD can use to verify the purported identity and capabilities of the accessory (or vice versa), and the accessory (or PMD) may be blocked from invoking certain commands or lingoes if the authentication is unsuccessful.

A command protocol supported by PMD 202 and accessory 220 can include a "remote GUI" lingo (or other group of commands) that can be used to communicate commands and data related to permitting a user to control the operation of PMD 202 via a remote GUI provided on accessory 220. The remote GUI lingo can include commands that accessory 220 can send to PMD 202 to provide information about the configuration of display 232 and input controls 222, as well as environmental information (such as where accessory 220 is installed, operational status of a vehicle or other equipment in or on which accessory 220 is installed, etc.). The remote GUI lingo can also include commands used by PMD 202 to deliver GUI image data to accessory 220 and commands used by accessory 220 to forward user input signals to PMD 202. Examples are described below.

Commands that can be used to implement a remote GUI according to an embodiment of the invention will now be described. In one embodiment, the commands can include commands usable to provide a PMD with information about the configuration of an accessory's display device and user input control(s). The commands can also include commands usable to provide the PMD with information about the environment in which the accessory operates and any special requirements of the accessory, such as logos or other content to be included in the remote GUI image. The commands can also include a command used to send remote GUI image data to the accessory and a command used to send user input information to the PMD.

FIG. 3 is a table 300 listing commands that can be used to implement a remote GUI according to an embodiment of the present invention. For each command, the direction and payload are indicated. "Direction" refers to whether the command is sent from the PMD to the accessory (denoted "P→A") or vice versa (denoted "A→P"). "Payload" refers to any data or other parameters associated with the command.

In some embodiments, a SetDisplayInfo command can be sent by accessory 220 to PMD 202 to provide information about display 232. In one embodiment, the information can include any or all of: the display dimensions (e.g., in pixels or inches or both) of a display device, color depth information for the display device (e.g., whether the display is color or black and white, the number of distinct color values supported, etc.); the display format of the display device (e.g., analog or digital input and signal formats); and the refresh rate of the display device. It is to be understood that any other information useful to configuring an image may be provided to PMD 202. In some embodiments, accessory 220 may provide multiple display devices, and the information provided to PMD 202 may include the number of display devices as well as separate configuration information for each display device.

In some embodiments, a SetControlInfo command can be sent by accessory 220 to PMD 202 to provide information about the type, number and location of user input controls 222. In one embodiment, the command can first identify the number of controls. Then, for each control, the command can identify the type (e.g., button, knob, touchscreen) and approximate location of the control.

In some embodiments, a SetEnvInfo command can be sent by accessory 220 to PMD 202 to provide information about the environment in which accessory 220 operates. For instance, the environmental information can include information as to where accessory 220 is installed, e.g., vehicle dashboard, airplane in-flight entertainment system; exercise equipment console, home entertainment system, etc.

In some embodiments, a SetEnvImage command can be sent by accessory 220 to PMD 202 to provide an image element that can be included in a remote GUI image. For example, the image element might be a logo associated with the manufacturer or provider of accessory 220 (or of a vehicle or other equipment in which accessory 220 is installed). As described below, PMD 202 can reserve an area of the remote GUI image for displaying an accessory-supplied image.

In some embodiments, a SetStatusInfo command can be sent by accessory 220 to PMD 202 to provide information about the status of the operating environment. For example, if accessory 220 is installed in an automobile dashboard, status information may include information such as whether the automobile is in motion (or in gear); whether it is day or night (e.g., whether the automobile's headlights are off or on); whether navigational route guidance is in progress; etc. If accessory 220 is installed in an exercise machine such as a treadmill, status information may include information such as whether the machine is currently in use as well as workout data such as elapsed or remaining time, calories burned, heart rate, current speed, or the like. As described below, status information provided by the accessory can be used by PMD 202 to augment the remote GUI images with status information, to adjust the appearance of the remote GUI images based on the current status, and/or to limit access to certain features (such as video playback) in a status-dependent manner.

In some embodiments, a RemoteGUIImageData command can be sent by PMD 202 to accessory 220 to deliver pixel data for a remote GUI image to accessory 220. The command can include pixel data for a portion or all of display 232. In some embodiments, a command packet may have a maximum size, which can limit the amount of pixel data that can be sent with a single RemoteGUIImageData command. In this case, PMD 202 can use multiple RemoteGUIImageData commands to send the pixel data; each command may include a parameter identifying the portion of the display to which the pixel data applies. Any format suitable for sending pixel data, including compressed formats, can be used. In other embodiments, accessory I/O interface 214 of PMD 202 can incorporate a video output interface, which can be analog or digital, and the remote GUI image can be delivered to accessory 220 through the video output interface rather than by sending commands.

In some embodiments a ProcessUserInput command can be sent by accessory 220 to PMD 202 to indicate the detection of user input in response to a remote GUI image. The command can include data indicating, e.g., which user control was operated and, if applicable, what operation was performed. For instance, for accessory 104 of FIG. 1B, the ProcessUserInput data can indicate which one of buttons 116a-h was pressed. For accessory 150 of FIG. 1C, the ProcessUserInput data can indicate pixel coordinates of a location on the screen that was touched by the user. For a user input device that can be manipulated in multiple ways (e.g., turning a knob either clockwise or counterclockwise or dragging a finger across a suitably configured touchscreen), the ProcessUserInput data can also indicate which manipulation of the input device was detected.

In some embodiments, an EnterRemoteGUIMode command can be sent from accessory 220 to PMD 202 (or vice versa) to initiate remote GUI mode operation, and an ExitRemoteGUIMode command can be sent from PMD 202 to accessory 220 (or vice versa) to terminate remote GUI mode operation.

FIG. 4 is a table 400 listing commands that can be used to implement a remote GUI according to another embodiment of the present invention. As in table 300, for each command the direction and payload are indicated.

In some embodiments, an AccessorySettings command can be sent by accessory 220 to PMD 202 to provide information about its characteristics. The AccessorySettings command can be a general-lingo command for providing information about the accessory's capabilities, preferences, and/or settings; in some embodiments, this command is also usable to send information unrelated to remote GUI operations. The payload of the AccessorySettings command can include a token identifying the type of information being provided (e.g., information about display capabilities, information about audio capabilities, etc.) and a descriptor associated with the token that carries the specific information. For example, in the case of a display token, the associated display descriptor can include information indicating properties of the accessory's display screen. In one embodiment, properties can include the vertical and horizontal physical screen size (e.g., in inches or centimeters); the vertical and horizontal screen resolution (e.g., in number of pixels); the vertical and horizontal dimensions of the portion of the screen allocated to the remote GUI (e.g., in number of pixels); the screen's color depth (e.g., in number of bits or simply an indicator of whether the screen is color or black and white); the screen's gamma (color correction) factor; and other features such as whether the display is touch-sensitive.

In some embodiments, the display descriptor can also include other information, such as the video signal format used by the accessory (e.g., NTSC, PAL, etc.); video connection type (e.g., composite video, S-Video, component video, etc.); video scan mode (e.g., interlaced or progressive); screen aspect ratio (e.g., 4:3 full-screen or 16:9 wide-screen); and so on. In other embodiments, some or all of this additional display information can be provided using, e.g., a Set VideoPreferences command of the general lingo. The Set VideoPreferences command may also provide the ability to adjust settings related to playback of video content but unrelated to the remote GUI, such as whether to show or hide captions and subtitles when playing videos, or whether the video image should be stretched to fill the screen or leave black bands. (As described above, the dimensions of the remote GUI image can be specified using the AccessorySettings command and may be unaffected by whether image stretching is selected for video playback.)

Those skilled in the art will appreciate that some combinations of preferences may cause errors; for example, selection between progressive and interlaced scan modes may not be permitted for composite video or S-video connections (which support only interlaced scan mode). If an error occurs, the PMD may send an error message as a command to the accessory.

In some embodiments, the AccessorySettings command can also be used to provide information about user input controls that are to be associated with the remote GUI. For example, a token associated with input control information can be defined. The associated descriptor can contain information about the controls, such as the number of controls, the type of each control (e.g., rotational, button, or touchscreen), the approximate location of each control, etc., similarly to the SetControlInfo command described above. The accessory can also assign each control a unique identifier and include the assigned identifier in the control descriptor. They accessory can subsequently use the assigned identifier to specify to the PMD which control was operated.

In some embodiments, PMD 202 may be able to selectively expose various content or functionality to accessory 220 via the remote GUI. For example, as described above PMD 202 can support multiple functionalities such as audio playback, video playback, still image browsing and playback, mobile telephony, e-mail, web browser, personal information storage and retrieval, execution of various third-party application programs that may be stored in storage device 206, GPS navigation capability, and so on. Further, a particular PMD 202 can be part of a family of media and communication devices, each of which may support different combinations of functionalities. In some embodiments, one PMD model might provide only audio playback while a second model provides audio and video playback, a third model provides audio and video playback as well as mobile telephony, and so on. Thus, which functionalities are available may vary from one PMD to the next, and which of the available functionalities should be exposed via the remote GUI may depend in part on the accessory and its operating environment.

To allow the accessory to control which of the available functionalities are or are not exposed via the remote GUI, some embodiments provide "options" commands, such as the GetPMDOptions, RetPMDOptions, and SetPMDOptions commands of table 400. The GetPMDOptions command can be sent by accessory 220 to PMD 202 to request information about which functionalities are available from PMD 202. The payload can include a selector, allowing the accessory to indicate whether the PMD should respond by listing all available functionalities (i.e., all functionalities that the PMD supports and is capable of exposing via the remote GUI) or only those functionalities that are active (i.e., currently selected for exposure via the remote GUI).

The RetPMDOptions command can be sent by PMD 202 to accessory 220 in response to the GetPMDOptions command. The payload can provide a list of available or active functionalities, depending on the selector in the GetPMDOptions command. In one embodiment, the list can be implemented as a bitmask with a different bit assigned to each functionality that could be exposed via the remote GUI if a particular PMD supports it. For instance, bits can be assigned to audio playback, video playback, still image browsing, web browsing, GPS navigation, telephone, and so on. If the GetPMDOptions selector requests a list of available functionalities, PMD 202 can set the bits to indicate which functionalities are available. If the GetPMDOptions selector requests a list of active functionalities, PMD 202 can set the bits to indicate which functionalities are currently active. In other embodiments, the list can be implemented using other data structures. For example, a unique byte code can be associated with each functionality, and the payload of the RetPMDOptions command can include a list of byte codes identifying available or active functionalities.

The SetPMDOptions command can be sent by accessory 220 to PMD 202 to specify the functionalities that should be made active. The payload can be a bitmask, e.g., using the same mapping of bits to functionalities as the RetPMDOptions command, and accessory 220 can set the bits according to whether a particular functionality should or should not be active. Thus, for example, if accessory 220 is installed in a vehicle, it may be desirable to expose only functionalities that will not unduly distract the driver, such as audio but not video playback, or navigation but not web browsing. Accessory 220 can set the bitmask appropriately for the desired behavior. Alternatively, in embodiments where byte codes are associated with each functionality, accessory 220 can send a list of the byte codes associated with the functionalities that should be active. In some embodiments, if accessory 220 requests a functionality that a particular PMD 202 does not support or cannot expose via the remote GUI, PMD 202 can respond with an error message.

PMD 202 can use the payload of the SetPMDOptions command in generating remote GUI images. For example, menus presented in a remote GUI image may include only items associated with active functionalities, or items associated with inactive functionalities may appear in darkened, grayed-out or other de-emphasized form, indicating to the user that they are not available. In some embodiments, if accessory 220 does not send a SetPMDOptions command, PMD 202 can expose a default set of functionalities. For example, all available functionalities can be exposed by default, or the default set can be limited to a minimal set of functionalities (e.g., only audio playback).

In some embodiments, accessory 220 can send the SetPMDOptions command at any time, including during remote GUI operation, to dynamically change the set of active functionalities. For instance, if accessory 220 is installed in an automobile, video playback or web browsing functionality might be inactive while the automobile is being driven and active while the automobile is parked. Whether an automobile is parked can be detected, e.g., by detecting whether an automatic transmission is shifted into "Park" or whether the automobile's parking brake is engaged. In response to detecting a transition into or out of a parked state, accessory 220 can send a new SetPMDOptions command to change the set of active functionalities.

The BrightnessAdjust command can be sent by accessory 220 to PMD 202 to signal a change in display brightness. The payload can be an indicator of the desired brightness. In one embodiment, the payload corresponds to a gain setting for a digital-to-analog converter used by PMD 202 to generate analog video output signals; other indicators of brightness can also be used. The BrightnessAdjust command can be used, e.g., in vehicles that have panel brightness controls, allowing PMD 202 to adjust the brightness of the remote GUI image in coordination with adjustments to brightness of other lights on the panel. Other commands related to adjusting display parameters can also be provided.

The SetStatusInfo command can be similar to the SetStatusInfo command described above with reference to FIG. 3. This command can be sent by accessory 220 to PMD 202 to provide information about changes in the status of the operating environment, and any of the status information described above can be provided.

In some embodiments, additional status changes can be provided using the SetStatusInfo command. For example, accessory 220 can be implemented in a head unit (e.g., in an automobile) that is capable of receiving video and/or audio input from different sources. Video input can be received, from PMD 220 or from a different source such as a built-in GPS navigation unit or DVD player. Similarly, audio input can be received from PMD 220 or from a different source such as a built-in radio receiver or CD or DVD player. A user may be able to operate a control of accessory 220 to change the audio and/or video source at any time, regardless of whether PMD 202 is currently providing a remote GUI. Accordingly, the SetStatusInfo command can be used to signal when the accessory's audio source selection changes to or from PMD 202 and/or when the accessory's video source selection changes to or from PMD 202. Depending on implementation, a particular PMD 202 might or might not act on the status-change information provided by the accessory; however, the accessory can always send the SetStatusInfo command in response to any status-change event regardless of whether or how a particular PMD 202 might respond.

In the embodiment described above with reference to FIG. 3, accessory 220 can communicate any type of user input to PMD 202 using a single ProcessUserInput command. Alternatively, as shown in FIG. 4, different commands can be associated with different types of user input controls. For example, depending on the type of input device that is operated, accessory 220 can send a ButtonInput command, a RotationInput command, or a TouchInput command. In some embodiments, accessory 220 can continue to send the appropriate input command at regular intervals (e.g., 20 ms, 50 ms, or the like) for as long as the user continues to operate a particular control.

The ButtonInput command can be used to communicate information about the operation of a control button to PMD 202. In some embodiments, as described above, accessory 220 can provide identifying information about each button in advance, e.g., using the AccessorySettings or SetControlInfo command as described above. In such embodiments, the ButtonInput command can simply include an identifier of the button that is activated, or a bitmask indicating which of the buttons are activated at the time of the ButtonStatus command. As noted above, the ButtonInput command can be sent at regular intervals for as long as a user continues to hold one or more buttons down. When all buttons are released, a final ButtonStatus command can be sent with a payload indicating that all buttons have been released.

In other embodiments, accessory 220 is not required to provide information about its input controls in advance of use. Instead, the accessory can internally map its controls to a set of generic GUI navigation buttons, e.g., Up, Down, Left, Right, Select, and Menu. In this case, the ButtonStatus command can be implemented with a "control-source" parameter that identifies the location of the active button (or other control) and a bitmask associated with the generic GUI navigation buttons. For instance, in one embodiment where accessory 220 is an automobile head unit, the control-source parameter can indicate where in the automobile the button is located (e.g., on the dashboard, on the steering wheel, on the center console); this parameter may identify a group of buttons (or other controls) rather than a single button. In this embodiment, accessory 220 determines the mapping of controls to the GUI navigation buttons of the bitmask and sets the appropriate bit (or bits) in the bitmask to indicate the control operation.

The RotationInput command can be used to communicate information about the operation of a rotational input control such as a free wheel or jog wheel. The payload can include a control-source parameter that identifies which rotational control was operated and additional parameters describing the operation.

The control-source parameter can be defined in various ways. In embodiments where accessory 220 provides information about its controls in advance of their use (e.g., using the AccessorySettings or SetControlInfo command as described above), the control-source parameter can be the control identifier assigned by accessory 220. In other embodiments, accessory 220 is not required to provide information about the controls in advance of use. In such embodiments, the control-source parameter can simply identify the approximate location of the control that was operated. For instance, in one embodiment where accessory 220 is an automobile head unit, the control-source parameter can indicate where in the automobile the rotational control is located (e.g., on the dashboard, on the steering wheel, on the center console) and the type of control (e.g., free wheel or jog wheel).

The type of operation can be characterized using additional parameters. For example, the direction of rotation (e.g., left/right, or up/down) can be indicated by a parameter. The particular action, e.g., whether the rotation has ended or is in progress, can also be indicated. For jog wheels, rotation can be considered as "in progress" for as long as the user continues to hold the wheel away from the home position even if the control is not actually moving. Alternatively, a separate action type can be defined to indicate that the user is holding the wheel in a position corresponding to the indicated direction of rotation.

In some embodiments, the amount of rotation of a free wheel or jog wheel during a relevant time interval can be measured and reported. For instance, some knobs provide a series of detents, and the amount of rotation can be reported as the number of detents traversed as a fraction of the total number of detents available. Alternatively, the amount of rotation can be measured in degrees or the like.

As noted above, the RotationInput command can be sent at intervals while the user continues to operate the control. Where the amount of rotation is reported, each instance of the command can report the amount of rotation since the last command was sent. When the rotational action ends, accessory 220 can send a final RotationInput command indicating that the operation has stopped.

The TouchInput command can be used to communicate information about the operation of a touch-sensitive input control. The payload can include a control-source parameter identifying which control was operated and additional parameters describing the operation.

As with other input commands described herein, the control-source parameter can be defined in various ways. For example, in embodiments where accessory 220 provides information about the controls in advance of use (e.g., using the AccessorySettings or SetControlInfo command as described above), the control-source parameter can be the control identifier assigned by accessory 220. In other embodiments, accessory 220 is not required to provide information about the controls in advance of use. In such embodiments, the control-source parameter can simply identify the approximate location of the control that was operated. For instance, in one embodiment where accessory 220 is an automobile head unit, the control-source parameter can indicate where in the automobile the touch-sensitive control is located (e.g., on the dashboard, on the center console) as well as the type of touch-sensitive input control (e.g., single-touch or multitouch).

The type of operation can be characterized, e.g., by coordinates indicating the location that was touched. In one embodiment, coordinates can be specified using position indexes in the horizontal and vertical directions (e.g., starting from top left of the touch-sensitive area), and accessory 220 can provide the maximum index along with the actual index of the touched location. Alternatively, the touched location can be identified using pixel coordinates, physical measurements (e.g., inches from the screen's edge), or the like. In some embodiments using a multitouch input control, accessory 220 can interpret a user action as a "gesture," e.g., tap, pinch, swipe, etc.; and the type of operation can be characterized by the gesture type as well as coordinates touched, speed, number of fingers used, and the like.

As with other input commands described herein, accessory 220 can send TouchInput commands at regular intervals as long as a touch operation continues. When the operation ends, accessory 220 can send a final TouchInput command indicating that the operation has stopped.

The EnterRemoteGUIMode and ExitRemoteGUIMode commands described above can allow accessory 220 to switch PMD 202 into or out of remote GUI mode. In some embodiments, PMD 202 may have more than two user interface ("UI") modes. For example, PMD 202 can have a standard operating mode in which it presents its native GUI on its own display, a remote GUI mode in which it delivers GUI images to accessory 220, and an external UI mode in which an accessory provides a local GUI for controlling PMD 202 and PMD 202 disables its native GUI.

Where more than two UI modes are provided, it can be useful for accessory 220 to determine and select the desired mode. Accordingly, the commands in table 400 include a GetUIMode command, a RetUIMode command, and a SetUIMode command. Accessory 220 can send the GetUIMode command to determine the current UI mode, and PMD 220 can respond with the RetUIMode command, whose payload includes an identifier of the current UI mode. To change the UI mode, accessory 220 can send the SetUIMode command with a payload identifying the desired mode.

It will be appreciated that the commands described herein are illustrative and that variations and modifications are possible. Commands from tables 300 and 400 can be used in combination with each other, and other commands may be added or substituted. In some embodiments, an acknowledgement (Ack) command can be sent by the PMD in response to any command from the accessory that does not require another responsive command. The Ack command can have a payload including a status indicator, which can be used to communicate errors.

In some embodiments, PMD 202 can maintain a list of configuration data for known remote-GUI-enabled accessories, e.g., in storage device 206. Each configuration can be associated with a particular accessory identifier, such as manufacturer plus model name, an arbitrarily assigned code, or the like. Instead of sending configuration information commands as described above, accessory 220 can send an identification command that provides the accessory identifier. PMD 202 can then access the stored configuration data for the accessory. This can result in faster and more efficient setup.

In other embodiments, the first time a particular accessory such as accessory 220 connects to PMD 202, the accessory can use the SetDisplayInfo and SetControlInfo commands described above to establish its configuration. PMD 202 can then assign the accessory a unique identifier, provide the assigned identifier to the accessory, and store the configuration information in storage device 206 in association with the identifier. On subsequent reconnections, the accessory can send an identification command with the unique identifier to PMD 202, and PMD 202 can access the stored configuration information.

Other commands may also be included, such as commands associated with identifying PMD 202 to accessory 220 (or vice versa), authenticating accessory 220 to PMD 202 (or vice versa), and providing additional information about the capabilities of PMD 202 to accessory 220. For example, using appropriate commands, accessory 220 can determine the specific model and/or serial number of PMD 202, whether a particular PMD 202 supports a remote GUI at all, and (where there are multiple possible versions of the remote GUI functionality), which version of remote GUI functionality the particular PMD 202 supports. Accessory 220 can use this information in determining whether to enter remote GUI mode with a particular PMD 202.

In any of the above-described commands, information can be sent as a structured data field, e.g., with certain bytes associated with certain information types. Alternatively, the command may include a bitmask parameter used to identify the type of information being delivered, and the data can be interpreted by the recipient in accordance with the bitmask.

Further, the set of commands can also include commands sent by PMD 202 to request any of the available information types, as well as commands sent by PMD 202 to acknowledge receipt of the information-providing commands from accessory 220.

In some embodiments, some information can be sent by accessory 220 either in response to a request from PMD 202 or without waiting for a request, e.g., in response to changed conditions. For instance, if accessory 220 is installed in a vehicle with automatic transmission, accessory 220 might send a SetStatusInfo command when it detects that the vehicle is shifted into or out of Park. Alternatively, accessory 220 might monitor the vehicle's speed and send a SetStatusInfo command reporting the current speed, either periodically or when it detects that the vehicle's speed crosses above or below a predetermined threshold. In one embodiment, video operation can be enabled or disabled depending on whether the vehicle's speed is above or below the threshold; the threshold can be set to zero or a slow speed such as 5 miles per hour.

Depending on implementation, either the accessory or the PMD can determine which functionalities of the PMD are to be exposed through the remote GUI. As described above, the accessory can send commands to select the functionality that should be presented, or the PMD can select functionality based on the current status of the accessory.

Figure 5:
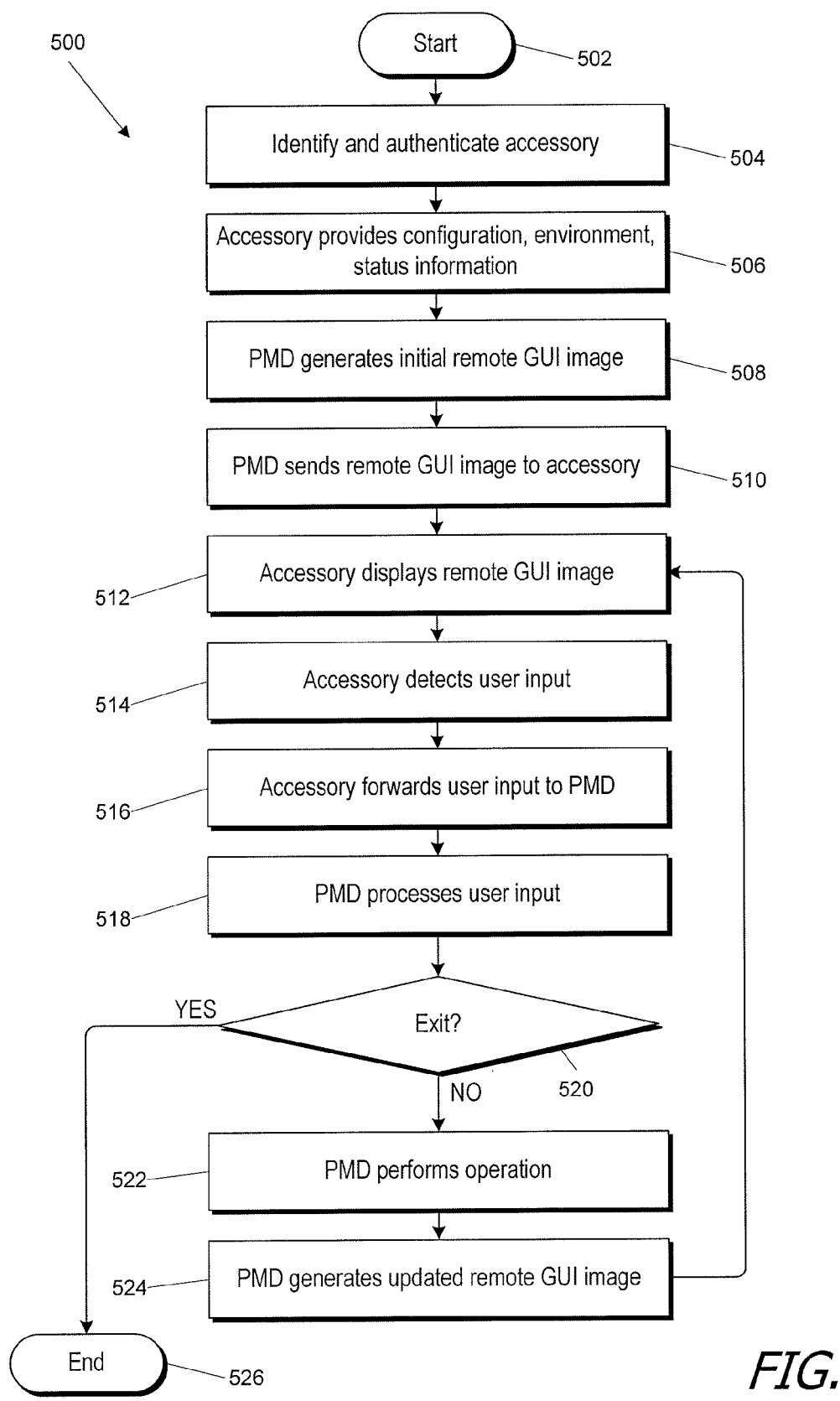
FIG. 5 is a flow diagram of a process that can be used to provide a remote GUI for a portable media device on an accessory device according to an embodiment of the present invention.

FIG. 5 is a flow diagram of process 500 that can be used to provide a remote GUI for PMD 202 on accessory device 220 according to an embodiment of the present invention. Process 500 starts (block 502) when accessory 220 becomes connected to PMD 202. At block 504, accessory 220 is identified and authenticated. Conventional techniques for identifying and authenticating an accessory, e.g., by exchanging commands and associated data, can be used. Block 504 can also include determining whether remote GUI mode is to be entered; for example, accessory 220 can send the EnterRemoteGUIMode command or the SetUIMode command described above.

At block 506, accessory 220 can provide configuration, environment and/or status information to PMD 202. In one embodiment, any combination of the SetDisplayInfo, SetControlInfo, SetEnvInfo, AccessorySettings, and SetStatusInfo commands described above can be used. Accessory 220 can also provide an accessory-specific (or environment-specific) image element to PMD 202, e.g., using the SetEnvImage command described above. In some embodiments, some or all of the configuration and environment information for accessory 220 can be pre-stored in PMD 202 as described above, and block 506 may include PMD 202 using the accessory identification obtained during block 504 to access the pre-stored configuration and environment information. Accessory 220 can also supplement or override any pre-stored information with new information using the commands described above.

At block 508, PMD 202 generates an initial remote GUI image using the information provided at block 506. In one embodiment, PMD 202 can apply various rules to adapt the native GUI image to the configuration of accessory 220 and/or to the status or environment of accessory 220. Such rules can be incorporated into a control program executed by processor 204 to generate remote GUI images.

For instance, the remote GUI can be adapted to the particular configuration of the accessory's display 232. For example, the size (in pixels or physical dimensions) of accessory display 232 of FIG. 2 (or the portion thereof allotted to the remote GUI) might be different from the size of PMD display 209. PMD 202 can modify the native GUI image by changing the size of image elements, changing the number of elements displayed, or both. Further, the aspect ratio (height to width) of accessory display 232 may be different from that of PMD display 209, and PMD 202 may arrange the elements of the remote GUI image to optimize use of the available space. In still another example, the color depth of accessory display 232 might also be different from that of PMD display 209, and PMD 202 can adjust the color settings for various image elements to produce a visually pleasing appearance.

Additionally, as noted above, accessory 220 may supply an image element to PMD 202. PMD 202 can determine a size and position for the accessory-supplied image element with in the remote GUI image. The element might be small, such as a logo in a corner of the display area, or it can be larger as desired.

In embodiments where accessory 220 provides information about its input controls 222 in advance of use, PMD 202 can adapt the remote GUI image to the particular configuration of the accessory's user input controls 222. For example, if accessory input control 222 provides a touch screen (e.g., as shown in FIG. 1C), GUI elements can be placed anywhere within the active area of the touch screen. If accessory input control 222 provides an array of buttons (e.g., as shown in FIG. 1B), active GUI elements can be placed near the button that is mapped to that element. PMD 202 can determine the mapping of GUI elements to buttons or other input controls and arrange the elements accordingly within the display area.

As described above, in some embodiments, accessory 220 need not provide any configuration information for input controls 222 in advance of their use. In such embodiments, PMD 202 can configure the remote GUI image without regard to the physical location of input controls 222. The remote GUI image can be organized to facilitate intuitive navigation with up/down and/or left/right buttons, e.g., by arranging selectable items in a list or grid and providing a cursor that visually distinguishes one item as being the current selection (i.e., the item that will be activated if the user presses a select button).

In some embodiments, PMD 202 can adapt the remote GUI to the environment of accessory 220. For example, if accessory 220 is incorporated into a dashboard console for an automobile, it may be desirable to adapt the remote GUI image for ease of use by a driver. Accordingly, PMD 202 can select different fonts or font sizes to make remote GUI elements and displayed information larger and easier to read. PMD 202 may also simplify the GUI, e.g., omitting animations or reducing the number and/or complexity of GUI elements on a single screen, to minimize driver distraction. In contrast, for an accessory that is mounted on an exercise machine, user distraction may be less of a concern, and PMD 202 can provide complex or animated remote GUI images.

In another example, the native GUI of PMD 202 may use a light background with dark text and highlighting. This can provide good visibility in daylight, but when driving at night, the resulting brightness might be distracting. In some embodiments PMD 202 can adapt the color scheme depending on whether accessory 220 is in day or night mode—e.g., selecting bright text and dark backgrounds for nighttime use, or dark text and bright backgrounds for daytime use. Day or night mode can be selected based on status information provided by accessory 220, or in some embodiments, the remote GUI can incorporate a user-settable option to select day or night mode.

As another example, PMD 202 may use environment and/or status information to determine which options or functionalities should be made available (exposed) in the remote GUI. For example, PMD 202 may provide video playback capability and may be able to send video content to accessory 220 for display. But playing video on a console visible to the driver of a moving automobile is hazardous. To mitigate this hazard, accessory 220 can provide status information indicating, e.g., whether the automobile is in motion (or in gear) at a given time. PMD 202 can use this status information to determine whether it is safe to allow video playback. If not, video playback options can be omitted from the remote GUI image or shown in a disabled state. Thus, for instance, PMD 202 can enable video playback only when an automobile is in "Park," only when the parking brake is engaged, or only when the vehicle's speed is below a particular threshold (such as 5 miles per hour). Similarly, any other functionalities supported by PMD 202 can be selectively hidden or exposed in response to environmental status information.

As yet another example, in some embodiments, accessory 220 can specify the functionalities or options that should be made available in the remote GUI, e.g., using the SetPM-DOptions command described above. In generating the remote GUI image, PMD 202 can limit the elements displayed to those that correspond to active functionalities or options. Inactive functionalities or options can be omitted from the remote GUI image entirely or included with a visual indication signifying that they are inactive (e.g., image elements corresponding to inactive functionalities can be grayed-out, darkened, lightened, or otherwise visually de-emphasized).

In some embodiments, PMD 202 can incorporate status information into the remote GUI. For example, if accessory 220 is incorporated into a console for an exercise machine, accessory 220 can provide PMD 202 with information about a workout in progress as noted above. PMD 202 can incorporate this information into the remote GUI image, allowing a user to monitor the progress of his or her workout while manipulating the remote GUI or playing video content. In embodiments where accessory 220 provides an image element (such as a logo), PMD 202 can incorporate the image element into the remote GUI. For example, PMD 202 may be programmed to reserve a portion of a remote GUI image for an accessory-supplied image element and may insert the accessory-supplied element into the reserved portion in any or all remote GUI images. PMD 202 can resize the accessory-supplied image element as needed to make it fit within the reserved area. (If the accessory does not supply an image element, the reserved portion can be left blank or filled with a default image element.)

Referring again to FIG. 5, at block 510, PMD 202 can send the remote GUI image to accessory 220. For example, PMD 202 can send the image using an analog or digital video output interface provided by accessory I/O interface 214 and PMD I/O interface 226 of FIG. 2. (The same video interface can also be used for delivering video content to accessory 220.) Alternatively, PMD 202 can use the RemoteGUIImageData command described above. At block 512, accessory 220 can display the remote GUI image. In some embodiments, accessory 220 displays the image as received and does not modify it; thus, PMD 202 can control the look and feel of the remote GUI. Blocks 510 and 512 can be repeated until user input is detected; for example, PMD 202 can repeatedly send the same remote GUI image at the refresh rate of the display device of accessory 220.

At block 514, accessory 220 detects user operation of one of input controls 222. At block 516, accessory 220 can forward the user input to PMD 202, e.g., using the ProcessUserInput command or the type-specific input commands (e.g., ButtonInput, RotationInput, TouchInput) described above. As noted above, the command can indicate which control was operated and, if applicable, the nature of the operation. Accessory 220 can forward the user input without processing it to identify a responsive action to be taken; instead, accessory 220 can simply forward an identification of the detected user action.

At block 518, PMD 202 can process the user input to determine an operation (or action) to be performed in response. At block 520, if the operation does not correspond to exiting the remote GUI mode, process 500 proceeds to block 522, where PMD 202 performs the operation requested by the user. Any operation made accessible through the remote GUI image can be performed, such as starting playback, pausing playback, adjusting settings, browsing or searching a database, and so on. Performing some operations may involve sending commands from PMD 202 to accessory 220 (e.g., to change settings such as volume, display brightness, etc.). Performing other operations (e.g., playback) may involve sending media content from PMD 202 to accessory 220. Still other operations (e.g., database queries) can be performed by PMD 202 without sending commands or content to accessory 220. At block 524, PMD 202 can generate an updated remote GUI image based on the selected operation. Process 500 can then return to block 512 to display the updated remote GUI image. It should be noted that some operations, such as playback, can be ongoing, and a playing track (or sequence of tracks) can continue to play while process 500 iterates. (Playback can be stopped, e.g., by the user selecting a pause or stop operation, which selection can be processed using process 500.)

Process 500 can continue until such time as a user selects an operation that entails exiting remote GUI mode at block 520. At that point, process 500 ends (block 526). In some embodiments, PMD 202 can signal accessory 220 that the remote GUI mode is ending, e.g., using the ExitRemoteGUIMode command described above. Thereafter, accessory 220 can return to its local GUI operating mode.

In some embodiments, PMD 202 can remain connected to accessory 220 after exiting remote GUI mode. Thus, PMD 202 can continue to send media content to accessory 220, so that a playing track can continue to play even after remote GUI mode is exited. Thus, for example, if accessory 220 is incorporated into a console of an exercise machine, the user may exit the remote GUI to change workout settings while a song or video continues to play. As another example, if accessory 220 is incorporated into an automobile dashboard console that also provides navigation functionality, the user can exit remote GUI mode to perform navigation operations while music continues to play.

Further, in some embodiments, accessory 220 can support a user input that, when selected, instructs accessory 220 to re-enter remote GUI mode. Because PMD 202 remains connected, accessory 220 can send an EnterRemoteGUIMode command in response to detecting this user input. Thus, the user can enter and exit the remote GUI mode as desired, controlling PMD 202 through the remote GUI mode and controlling other features of accessory 220 through a local user interface.

In other embodiments, accessory 220 can provide source-selection input controls that allow a user to select among multiple sources of audio and/or video signals. For example, accessory 220 can be implemented in an in-vehicle head unit that also supports AM, FM, and/or satellite radio receivers; a GPS-based navigation system; environmental controls (e.g., adjusting a cabin thermostat); and so on, in addition to the remote GUI functionality provided by PMD 202. The head unit may provide buttons (or other user input controls) associated with selecting among these functionalities. The head unit may, but need not, map such buttons to the remote GUI. For instance, if the user operates a button to request an alternate audio source (e.g., FM radio) during remote GUI operation, the head unit can interpret the request and switch the audio source. In some embodiments, the head unit can notify PMD 202 of the change, e.g., using a SetStatusInfo command as described above. When the audio and/or video source is switched away from PMD 202, PMD 202 can continue to generate the remote GUI image or not, depending on implementation. In one embodiment, PMD 202 continues to generate the remote GUI image regardless of audio source selection but discontinues generating the remote GUI image if the video source selection is switched away from PMD 202.

It will be appreciated that process 500 is illustrative and that variations and modifications are possible. Steps or blocks described as sequential may be executed in parallel, order of steps may be varied, and steps may be modified or combined. Commands and communication protocols other than those described herein can be implemented to allow a portable media device to provide a remote GUI image to an accessory and to process user input responsive to the remote GUI image.

Figure 6:
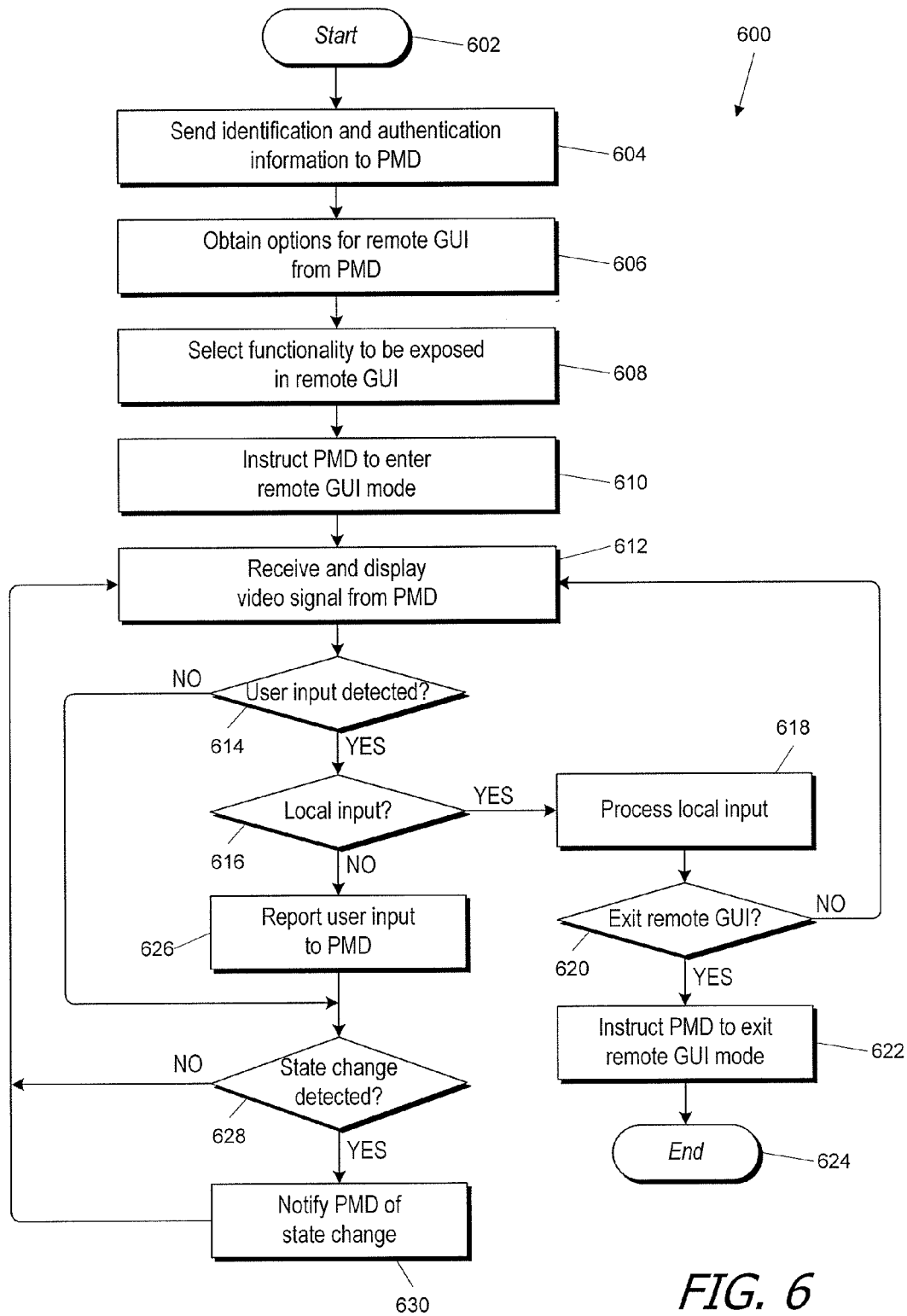
FIG. 6 is a flow diagram of a process that can be used in an accessory to support a remote GUI according to an embodiment of the present invention.

FIG. 6 is a flow diagram of a process 600 for operating an accessory (e.g., accessory 220 of FIG. 2) in conjunction with a PMD (e.g., PMD 202 of FIG. 2) that provides a remote GUI according to an embodiment of the present invention. Process 600 starts (block 602) when accessory 220 becomes connected to PMD 202. At block 604, accessory 220 can send identification and authentication information to PMD 202. In some embodiments, the identification information can include an indication that accessory 220 is capable of using the remote GUI functionality of PMD 202 and can also include configuration information for the accessory's display and/or input controls. For example, the AccessorySettings command and/or SetDisplayInfo and SetControlInfo commands described above can be used. Authentication, where provided, may include exchanging digital certificates and/or cryptographic messages with PMD 202. In some embodiments, authentication can be unidirectional (e.g., accessory 202 authenticates itself to PMD 202 or vice versa) or bidirectional (e.g., each device authenticates itself to the other). During identification and authentication, accessory 220 and PMD 202 can also exchange messages regarding which version of a remote GUI protocol and/or supporting software program each implements.

If identification or authentication fails at block 604, process 600 can exit (not explicitly shown). For example, PMD 202 can decline further communication with accessory 220 if accessory 220 fails to authenticate itself. As another example, if the version of a remote GUI generation program used by PMD 202 is not compatible with or not approved by accessory 220, accessory 220 can determine not to enter remote GUI mode.

If, however, identification and authentication at block 604 succeed, process 600 proceeds to block 606. At block 606, accessory 220 can obtain options related to the remote GUI from PMD 220, e.g., using the GetPMDOptions and RetPMDOptions commands. For example, accessory 220 can send the GetPMDOptions command to determine which functionalities PMD 202 is capable of exposing via the remote GUI. At block 608, accessory 220 can select one or more functionalities that should be exposed, e.g., using the SetPMDOptions command.

At block 610, accessory 220 can instruct PMD 202 to enter remote GUI mode, e.g., using the EnterRemoteGUIMode or SetUIMode command described above. In some embodiments, accessory 220 automatically instructs PMD 202 to enter remote GUI mode after establishing that a particular PMD is compatible with the accessory's level of support for remote GUI mode. In other embodiments, accessory 220 can wait for user input or another event indicating that remote GUI mode should be entered before instructing PMD 202 to enter remote GUI mode.

At block 612, accessory 220 receives and displays a video signal from PMD 202; in general, this video signal can provide a remote GUI screen image and/or other image(s). For example, if PMD 202 is being operated to play back video content, the signal can include the video content. If PMD 202 is being operated to display stored still images (e.g., photos), the signal can include a still image.

In some embodiments, the video signal is an analog signal intended to cover the entire screen, and accessory 220 can simply generate display pixels in response to the video signal. In other embodiments, the remote GUI image covers only a portion of the screen, and accessory 220 can blend the video signal from PMD 202 with a signal from another source that provides the image for the rest of the screen. Digital video signals in various formats can also be used.

At block 614, accessory 220 determines whether user input is being received. If so, accessory 220 processes the user input. More specifically, at block 616, accessory 220 determines whether the input is "local" input. For example, as described above, accessory 220 may reserve some of the input controls as not being mapped to remote GUI functions, such as controls allowing the user to switch audio or video sources, or the like. Such reserved controls provide "local" input that accessory 220 can process rather than forwarding to PMD 202. If such local input is received, then the local input is processed by accessory 220 at block 618.

At block 620, accessory 220 determines whether the remote GUI mode should be exited in response to the local input. If so, at block 622, accessory 220 instructs PMD 202 to exit remote GUI mode, e.g., using the SetUIMode or ExitRemoteGUIMode commands described above, and process 600 ends (block 624). Otherwise, process 600 returns to block 612 and accessory 220 continues to receive and display a video signal from PMD 202.

If, at block 616, user input other than local input is detected, accessory 220 reports the user input to PMD 202 at block 626. Depending on implementation, the ProcessUserInput command or a type-specific input command (e.g., ButtonInput, RotationInput, TouchInput commands) described above can be used to report user input to PMD 202. These commands can indicate that a particular input event occurred while allowing PMD 202 complete control over how the event is interpreted and whether it has any effect on the displayed remote GUI image.

As described above, in some embodiments, accessory 220 continues to send commands reporting user input to PMD 202 for as long as the user continues to operate a control and sends a final command to indicate that the operation has ended. The reported user input may or may not affect the appearance of the remote GUI; any changes can be made by PMD 202 without any intervention by accessory 220 (other than reporting the user input). In addition the reported user input may result in PMD 202 invoking its own functionality, e.g., playing a track, initiating a phone call, or the like; again, accessory 220 does not need to interpret the user input or determine what functionality to invoke.

Regardless of whether user input is detected at block 614, process 600 can also check at block 628 to determine if any state changes have occurred in the operating environment of accessory 220. For example, in a vehicle, if the headlights are turned on or off, the changed state of the headlights can be a detectable change in the operating environment. In a console of an exercise machine, the beginning or ending of a workout can be a detectable change. As yet another example, as described above, accessory 220 can detect when the user changes the selected input source for audio and/or video. At block 630, accessory 220 can report a detected state change to PMD 202, e.g., using the SetStatusInfo command described above. As with user input, status changes may result in PMD 202 modifying the remote GUI image and/or invoking its own functionality. Accessory 220 does not need to determine or specify what (if any) effect a particular state change should have; it can simply report various state changes to PMD 202.

In some embodiments, accessory 220 can also respond to a detected state change by determining that the selection of PMD functionality to be exposed via the remote GUI should be changed. For example, if accessory 220 is an in-vehicle head unit, accessory 220 may be able to determine when the vehicle transitions into or out of a "parked" state (e.g., by detecting when an automatic transmission is shifted into or out of Park or by detecting when a parking brake is engaged or disengaged). In some embodiments, accessory 220 can allow certain functionality that is unavailable when the vehicle is not parked (e.g., video playback or third-party application programs that may cause unacceptable driver distraction) to become available when the vehicle is parked. Accordingly, notifying PMD 202 of a state change at block 630 can include sending a new SetPMDOptions command to change the selection of functionalities to be exposed via the remote GUI in addition to or instead of providing another state-change notification.

Process 600 can continue indefinitely while accessory 220 continues to receive and display video signals from PMD 202 and to report user input and state changes to PMD 202. Process 600 can end, e.g., when accessory 220 determines at block 620 that remote GUI mode should be exited. Once process 600 ends, it can be restarted, e.g., when accessory 220 reconnects to PMD 202. In some embodiments, accessory 220 can provide a user input control that can be operated to re-enter the remote GUI mode without requiring disconnection and reconnection; such an accessory can re-enter process 600, e.g., at step 610, as long as the accessory remains connected to the PMD.

It will be appreciated that process 600 is illustrative and that variations and modifications are possible. Operations described as sequential may be executed in parallel, order of operations may be varied, and operations may be modified, combined, added or omitted. For instance, those skilled in the art will appreciate that while a cycle of operations to check for user input and state changes may be suggested by the flow diagram, other implementations (e.g., based on interrupts) are possible. In some embodiments, PMD 202 can determine under certain conditions that remote GUI mode should be exited and exit remote GUI mode without receiving an exit command from accessory 220. Depending on implementation, PMD 202 might or might not notify accessory 220 when PMD 202 decides to exit remote GUI mode.

Figure 7:
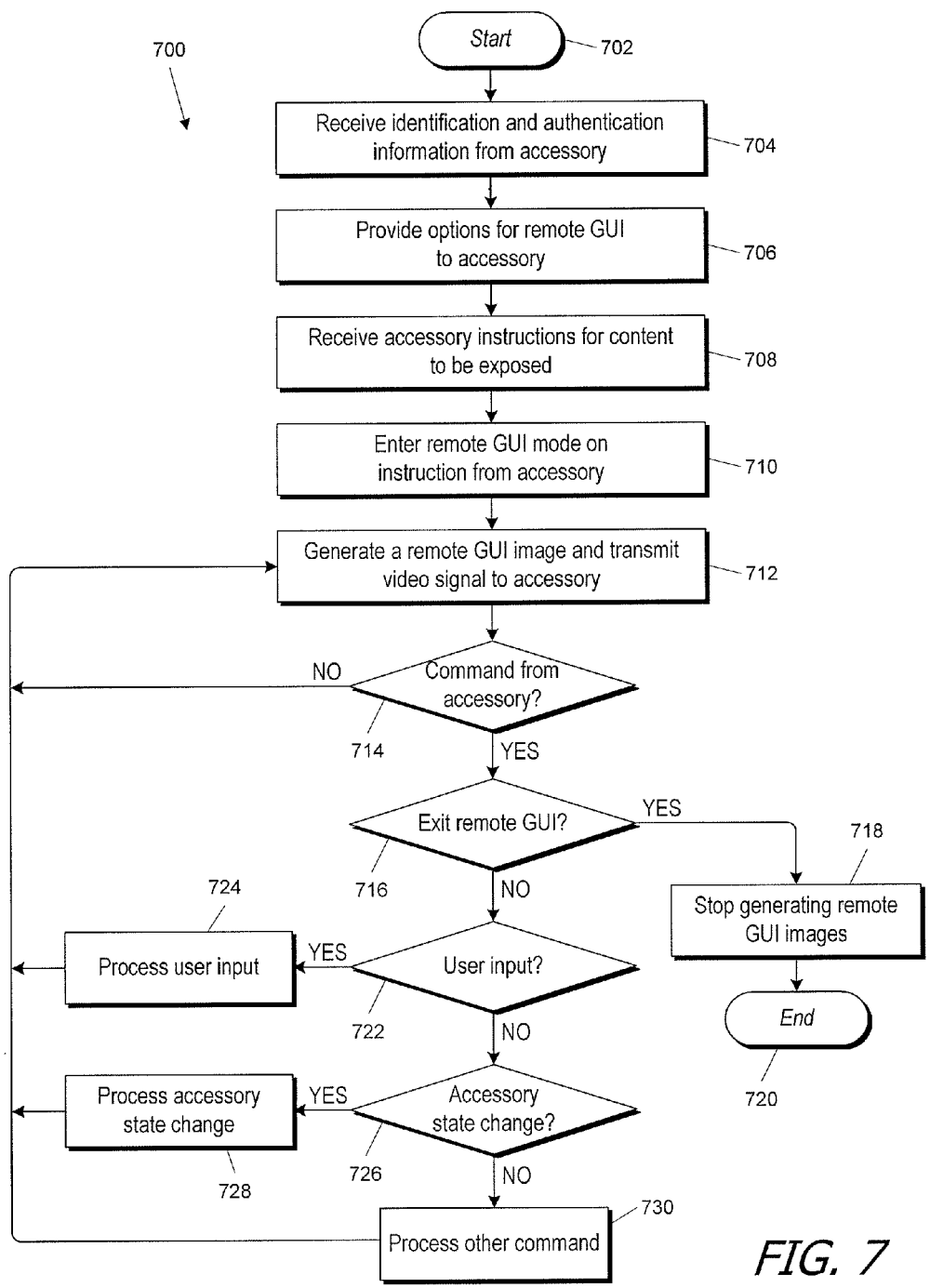
FIG. 7 is a flow diagram of a process that can be used in a portable media device to provide a remote GUI to an accessory according to an embodiment of the present invention.

FIG. 7 is a flow diagram of a process 700 for remote GUI operation that can be executed in a PMD (e.g., PMD 202 of FIG. 2) according to an embodiment of the present invention. Process 700 starts (block 702) when an accessory (e.g., accessory 220 of FIG. 2) becomes connected to PMD 202. At block 704, PMD 202 can receive identification and authentication information from accessory 220. In some embodiments, the identification information can include an indication that accessory 220 is capable of using the remote GUI functionality of PMD 202 and can also include configuration information about the accessory's display and/or input controls. For example, the AccessorySettings command and/or SetDisplayInfo and SetControlInfo commands described above can be used. Authentication, where provided, may include exchanging digital certificates and/or cryptographic messages between PMD 202 and accessory 220. In some embodiments, authentication can be unidirectional (e.g., accessory 202 authenticates itself to PMD 202 or vice versa) or bidirectional (e.g., each device authenticates itself to the other). During identification and authentication, PMD 202 and accessory 220 can also exchange messages regarding which version of a remote GUI protocol and/or supporting software program each implements.

If identification or authentication fails at block 704, process 700 can exit (not explicitly shown). For example, PMD 202 can decline further communication with accessory 220 if accessory 220 fails to authenticate itself.

After successful identification and authentication, process 700 can proceed to block 706. At block 706, PMD 202 can provide information related to remote GUI options to accessory 220. In some embodiments, the information can be provided in response to a request from accessory 220; for instance, PMD 202 can receive the GetPMDOptions command described above and provide the options using the RetPMDOptions command described above. At block 708, PMD 202 can receive instructions from the accessory regarding functionalities to be exposed in the remote GUI; for example, PMD 202 can receive a SetPMDOptions command from accessory 220.

At block 710, PMD 202 can enter remote GUI mode. In some embodiments, PMD 202 enters remote GUI mode only on instructions from accessory 220. For example, PMD 202 can receive the EnterRemoteGUIMode or SetUIMode command described above. In some embodiments, if the version of a remote GUI generation program used by PMD 202 is not compatible with or not approved by accessory 220, accessory 220 can determine not to enter remote GUI mode, in which case process 700 would not proceed past block 710.

At block 712, PMD 202 generates a remote GUI image and transmits a corresponding video signal to the accessory. In some embodiments, the video signal can be transmitted using analog or digital video output pins of PMD 202; in other embodiments, the RemoteGUIImageData command described above can be used.

Generation of the remote GUI image can be similar to that described above with reference to FIG. 5. In some embodiments, the remote GUI image for any particular operating condition is based on the PMD's native GUI image. The native GUI image can be modified to take into account characteristics of the accessory's display, such as size (in pixels or physical dimensions), aspect ratio, color depth, and the like. An image element supplied by the accessory can also be incorporated into the remote GUI image. In some embodiments, the image can be modified to reflect the location of accessory input controls; however, as described above, this is not required. The remote GUI image can also be adapted to the operating environment of a particular accessory (e.g., making GUI elements larger and/or easier to read if the accessory is in an automobile or other vehicle) and/or to the operating status of the accessory (e.g., day or night mode). The selection of which functionality to expose can be based on environment and/or status information, or the selection can be based on explicit instructions from the accessory (e.g., a SetPMDOptions command).

At block 714, PMD 202 determines whether a command has been received from accessory 220. If not, PMD 202 can continue to generate remote GUI images (or simply resend the same remote GUI image) at block 712 until a command is received. If a command is received at block 714, PMD 202 processes the command.

More specifically, at block 716, PMD 202 determines whether the received command indicates that remote GUI mode should be exited (e.g., the ExitRemoteGUIMode or SetUIMode commands described above). If so, PMD 202 stops generating remote GUI images at block 718, and process 700 ends (block 720).

If, at block 716, the received command does not indicate that remote GUI mode should be exited, then at block 722, PMD 202 determines whether the command indicates user input received by accessory 220. For example, PMD 202 can receive the ProcessUserInput command or any of the type-specific input commands (e.g., ButtonInput, RotationInput, TouchInput commands) described above, or other commands indicative of user input. If user input is received, then at block 724 PMD 202 processes the user input.

Processing the user input at block 724 can include a number of different operations depending on the specific input received and the current state of the remote GUI. For example, if the remote GUI is currently displaying a list of items, one of which can be highlighted, certain user input (e.g., operation of up or down buttons, turning of a wheel or knob, a swipe gesture on a touch screen) can be interpreted as scrolling the list or moving the highlighting to a different item. PMD 202 can update the remote GUI image to show a different highlighted item or a different portion of the list (or both) based on the user input.

Similarly, if the remote GUI is currently displaying a list of items, certain user input (e.g., operation of a select button, releasing of a wheel or knob, a tap gesture on a touch screen) can be interpreted as selecting an item (e.g., the currently highlighted item). PMD 202 can determine which item is being selected and invoke a functionality associated with the selected item. For example, if the selected item is a media track, PMD 202 can initiate playback of the track; if the selected item is an icon associated with a PMD functionality (e.g., telephone), PMD 202 can invoke that functionality; if the selected item is an icon associated with a particular application, PMD 202 can launch the application; and so on. Thus, processing the user input at block 724 can include updating the remote GUI image to reflect the user input and/or invoking functionality of PMD 202 based on the user input. After processing the user input, PMD 202 can continue to transmit the remote GUI image (with any applicable updates) at block 712.

If, at block 722, the received command is not a user input command, then at block 726 PMD 202 can determine whether the received command is indicative of a state change in the accessory, e.g., the SetStatusInfo command described above. If so, then PMD 202 can process the state change at block 720. Depending on the particular state change indicated, processing of the state change might or might not include updating the remote GUI image. For example, if the state change indicates a transition from day to night mode, the remote GUI image can be updated to reflect a "night-mode" color scheme. If the state change indicates that the accessory is switching away from using PMD 202 as a video input source, PMD 202 can suspend updating and/or transmitting remote GUI images until a subsequent state change command indicates that the accessory is switching back to using PMD 202 as a video input source. Other state changes can affect the selection of functions to be exposed via the remote GUI (e.g., the PMD can receive a new SetPMDOptions command or can determine based on the state-change information that the selection should change), and the remote GUI image can be updated to reflect the currently available functions. Still other state changes can affect ongoing operations within the PMD. For example, in an embodiment where PMD 202 is used with an in-vehicle head unit as accessory 220, PMD 202 can automatically pause or exit video playback if accessory 220 signals that the vehicle has been taken out of a parked state. After processing the state change, PMD 202 can display the remote GUI image (with any applicable updates) at block 712.

If, at block 726, it is determined that the received command is not a state change command, then at block 730, the command is processed. In some embodiments, some commands are ignored during remote GUI mode operations; for example, commands requesting information about stored content on PMD 202 can be ignored. (The user can access such information via the remote GUI without PMD 202 needing to supply any information to the accessory.) Other commands, however, can be accepted and processed at block 730. For example, some accessories have buttons associated with playback control (e.g., play/pause, fast-forward, and rewind buttons), and commands invoking PMD functions associated with playback control can be processed at block 730, thereby allowing a user to use the accessory's buttons in an intuitive way.

Process 700 can continue indefinitely, with PMD 202 continuing to generate and transmit remote GUI images that it updates based on command input from accessory 220 and to invoke its internal functions based on user input relayed by accessory 220. Process 700 can end, e.g., when PMD 202 receives a command indicating that remote GUI mode should be exited or when accessory 220 becomes disconnected from PMD 202. Once process 700 ends, it can be restarted, e.g., when PMD 202 reconnects to accessory 220. In some embodiments, after exiting remote GUI mode, PMD 202 can accept a subsequent command from accessory 220 to re-enter remote GUI mode without requiring disconnection and reconnection; in such embodiments, PMD 202 can simply re-enter remote GUI mode at block 710.

It will be appreciated that process 700 is illustrative and that variations and modifications are possible. Operations described as sequential may be executed in parallel, order of operations may be varied, and operations may be modified, combined, added or omitted. For instance, those skilled in the art will appreciate that while a cycle of operations to check for user input and state changes may be suggested by the flow diagram, other implementations (e.g., based on interrupts) are possible. In some embodiments, PMD 202 can determine under certain conditions that remote GUI mode should be exited and exit remote GUI mode without receiving an exit command from accessory 220. Depending on implementation, PMD 202 might or might not notify accessory 220 when PMD 202 exits remote GUI mode.

Figures 8, 9A:
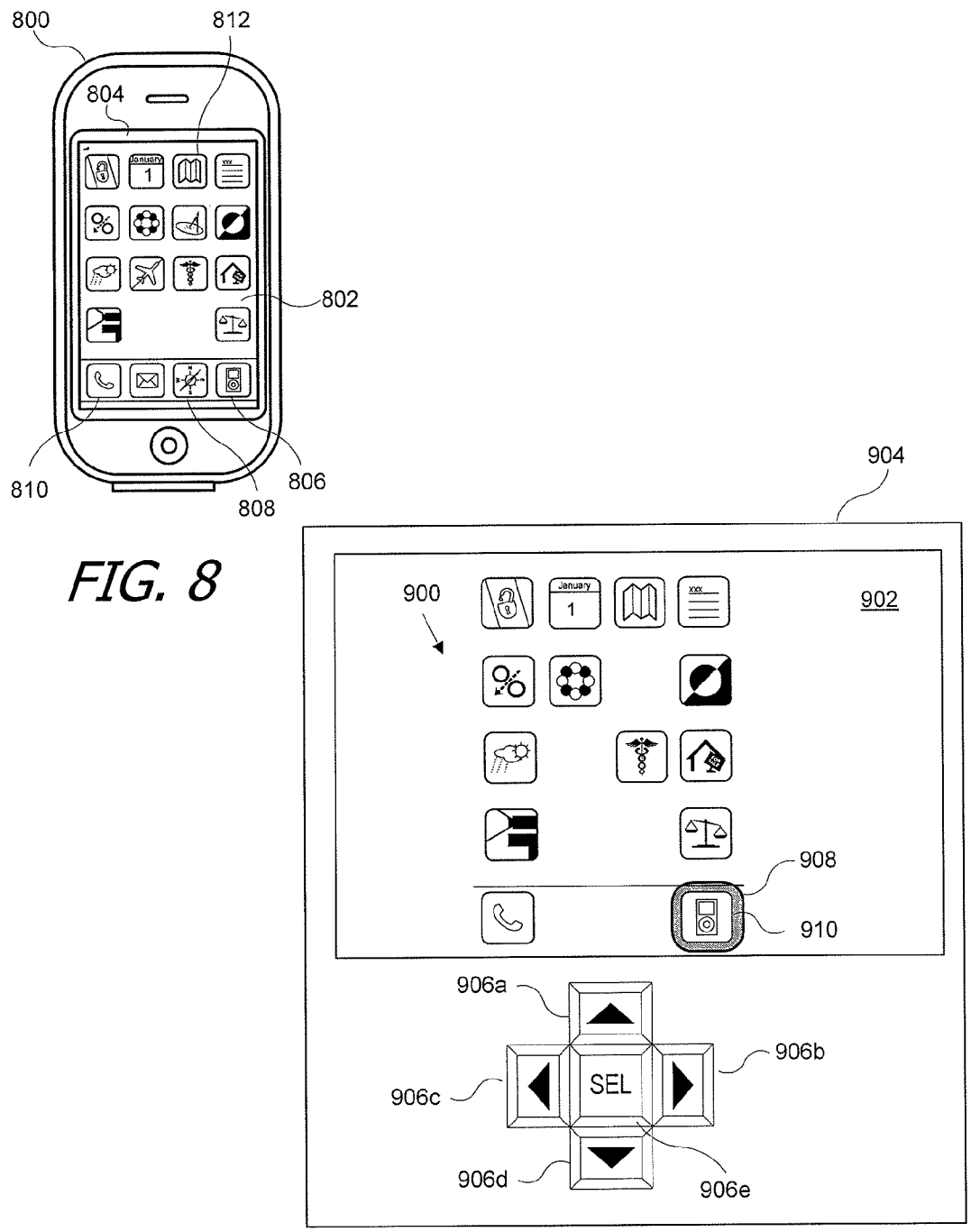
FIG. 8 illustrates a native GUI of a portable media device.
FIGS. 9A and 9B illustrate remote GUI images for an accessory according to embodiments of the present invention.

As noted above, a PMD can expose any of its functionalities via the remote GUI. FIG. 8 illustrates a native GUI on a PMD 800 that has a number of different functionalities. Native GUI image 802 includes a number of icons displayed on a touchscreen 804 of PMD 800. The user can touch an icon to select the associated functionality. For example, icon 806 is associated with media player functionalities (including audio and video playback); icon 808 is associated with a web browser; icon 810 with telephony; icon 812 with maps and navigation aids; and so on.

FIG. 9A illustrates a remote GUI image associated with the native GUI of PMD 800 according to an embodiment of the present invention. Remote GUI image 900 is displayed on a display screen 902 of an accessory 904 that has associated control buttons 906*a-e* (e.g., up, down, left, right, select). Remote GUI image 900 includes icons that look generally like the icons of native GUI image 802, and the user can activate functionalities of PMD 800 by selecting the corresponding icon using control buttons 906*a-e*. In the embodiment shown, one of the icons is highlighted with cursor 908 to indicate that it will be activated if the user presses select (SEL) button 906e. Thus, icon 910 (media player) is currently highlighted. A user can change the selection by operating arrow buttons 906a-d to move cursor 908 up, left, right, or down and select an icon using the select (SEL) button 906e.

In the embodiment shown, not all functionalities of PMD 800 are exposed via the remote GUI, and icons corresponding to functionalities not exposed are not drawn in remote GUI image 902. Thus, for example, web browsing (icon 808) is not available. Other embodiments may provide the icons for unexposed functionalities in grayed-out or otherwise de-emphasized form so that the user can readily determine which functionalities are available for selection.

Figure 9B:
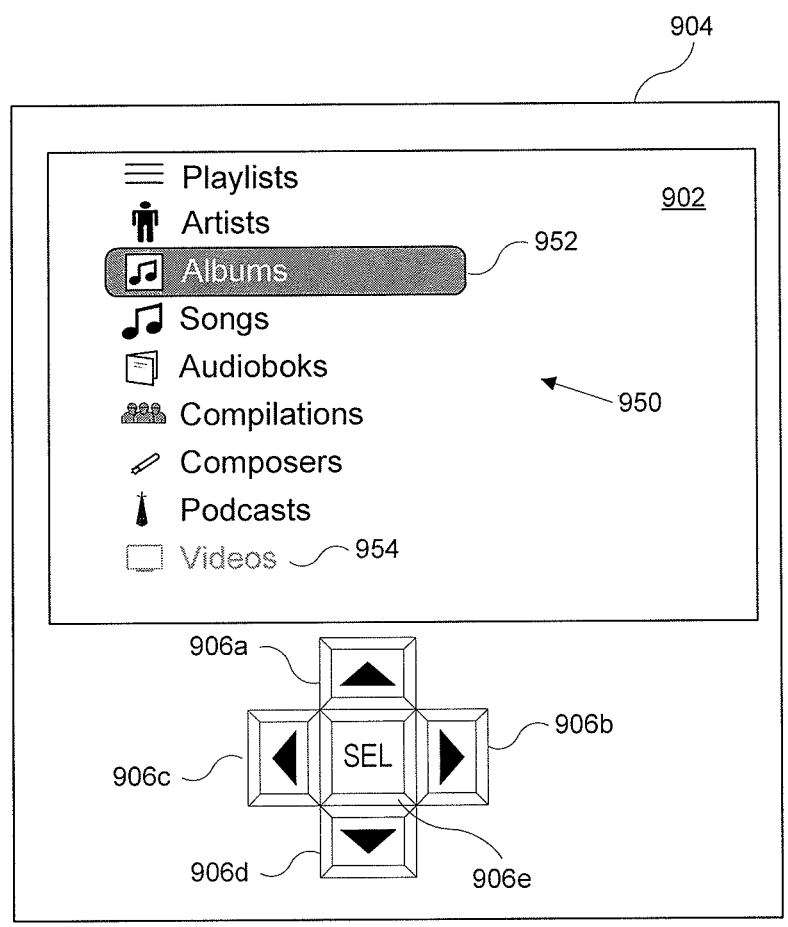

FIG. 9B illustrates a second remote GUI image 950 according to an embodiment of the present invention. Image 950 provides a selection menu for media player functionalities. In some embodiments, PMD 800 can generate image 950 when a user selects media player icon 910 in image 900 of FIG. 9A. Image 950 provides media playback options. Similarly to image 900 described above, image 950 provides a cursor 952 that the user can move by pressing buttons 906a-d; the item currently highlighted by the cursor can be selected by pressing select button 906e. In the example shown, video playback is not available (e.g., because accessory 900 has instructed PMD 800 not to expose this functionality); this is indicated by graying out "Videos" menu item 954. Alternatively, menu item 954 (or any other item corresponding to unexposed functionality) can simply be omitted from image 950.

It will be appreciated that the remote GUI images and controls described herein are illustrative and that variations and modifications are possible. For example, in some embodiments, if the accessory provides configuration information indicating that it has a touchscreen display, the cursor can be omitted. In some illustrated examples, the remote GUI images closely resemble the native GUI images, but this is not required. For example, a grid of icons in a native GUI image can be presented in a remote GUI as a list, or a list of items in the native GUI image can be presented in a remote GUI image as a grid, and so on. In some embodiments, the PMD generates remote GUI images that are similar or identical across different accessories, thus providing a consistent user experience. The particular functionalities shown are intended as illustrative and not limiting.

In some embodiments, the portable media device can have one or more third-party applications resident on it in addition to the native applications. A third-party application or "application" can be software code that is not native to the portable media player and which is designed to perform some specific task or tasks. In other words, a third-party application is an application that can be installed by the user of the portable media device and is not part of the standard configuration of the portable media device. For example, Pandora® is a third-party application that can be executed by various portable media devices for playing media items, e.g., music streamed over the Internet. Each such third-party application can have an associated graphical user interface (GUI) that can be used to interact with the application. The third-party application can generate various items of information based on its functionality. For example, a media player application such as Pandora® can generate information about the media item that is being played or has been queued up to be played. In some embodiments, such information about the media item can include but is no limited to name of the media item, artist name, album name, genre, total time for the media item, time elapsed, time remaining, album artwork, etc. Collectively this information can be referred to as metadata associated with the media item.

After the metadata is generated by the third-party application, this metadata can be provided to an operating system of the portable media device, e.g., iOS for the iPod®, iPhone®, and iPad® line of products by Apple Inc. The operating system can use this metadata received from the third-party application to generate a remote GUI image to be sent to an accessory that supports the remote GUI feature. The remote GUI image can include displayable information and can also have non-displayable information associated with it. For example, displayable information can include information that can be displayed on the display of the accessory and/or the portable media player, e.g., name of the song or album artwork. Non-displayable information associated with the remote GUI image can include resolution of the remote GUI image, size of the remote GUI image, etc.

In some embodiments, the portable media device can define a set of one or more remote GUI image types based on the metadata provided by the third-party application. A remote GUI image conforming to one of the remote GUI image types from the set of remote GUI image types can be generated and communicated to an accessory based on the capabilities and preferences of the accessory. In some embodiments, the displayed information in the remote GUI image can only include the name of the third-party application associated with it. In other embodiments, the displayed information in the remote GUI image can include some or all of the metadata associated with a media item being played by the third-party application. Thus, the portable media device can generate several types of remote GUI images for each third-party application that can include varying amount of displayed information. It is to be noted that displayed information included in a remote GUI image can depend on the data provided by the third-party application and other generic data that can be generated by the portable media device. The following description uses a media player third-party application referred to as "WebRadio" that can stream media over the Internet to explain the various embodiments. However, one skilled in the art will realize that the embodiments are equally applicable to any other third-party application and that the embodiments described below should not be construed to unduly restrict them to only the disclosed third-party applications. A remote GUI image can be a static image or can include video information.

Figure 10A:
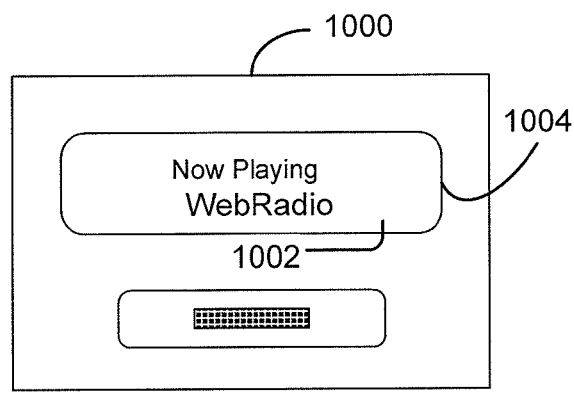
FIGS. 10A-C illustrate an accessory displaying various types of remote user interface images according to an embodiment of the present invention.
Figure 10B:
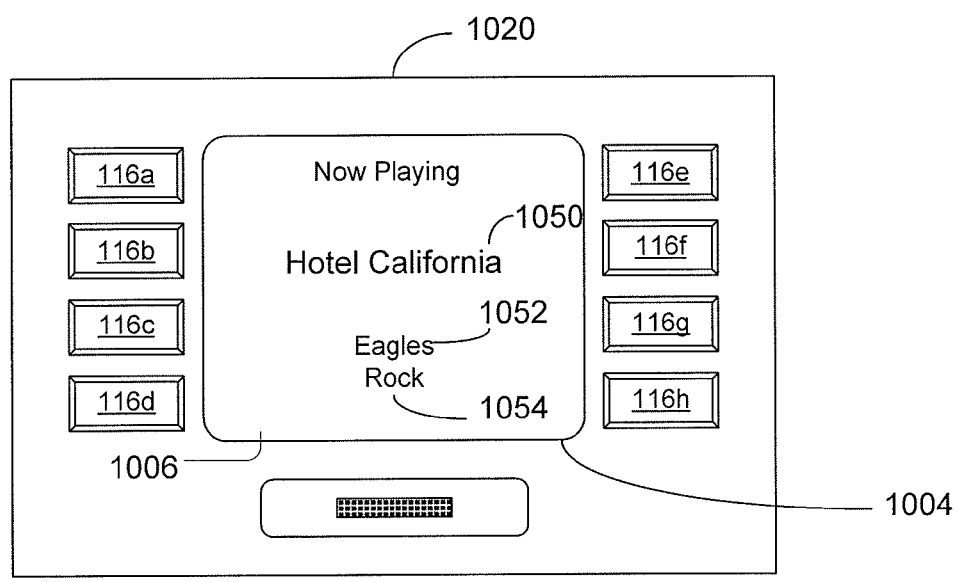
Figure 10C:
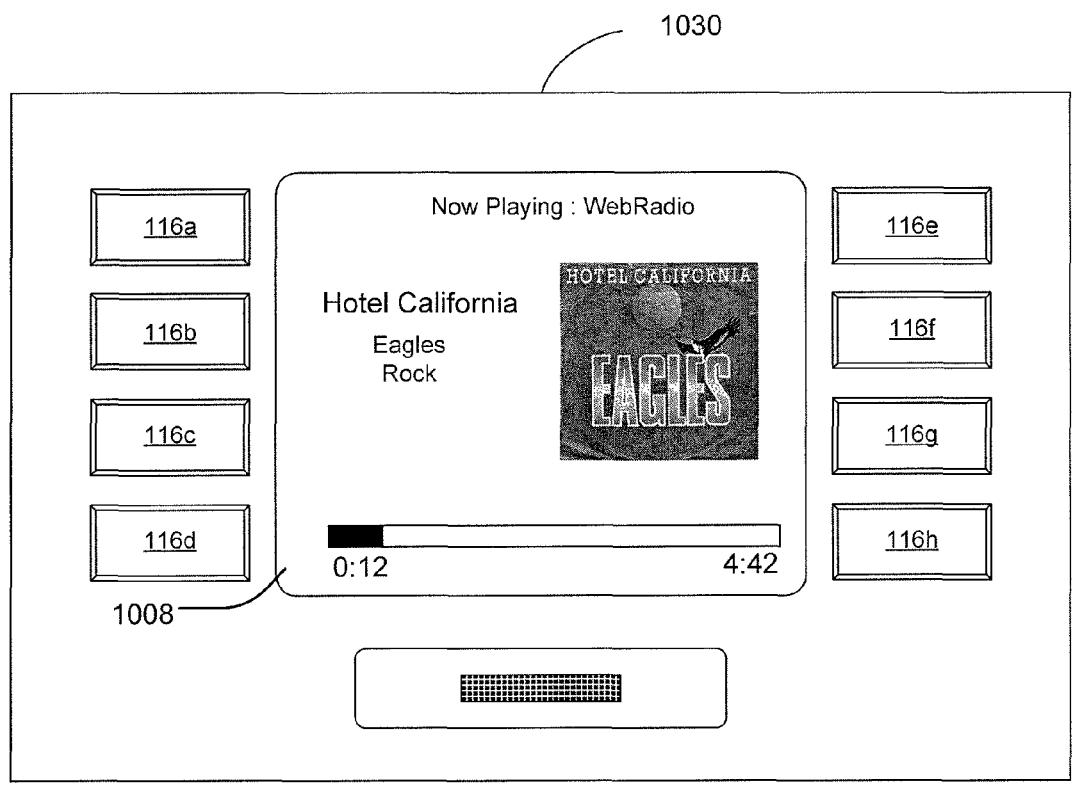

FIGS. 10A-10C illustrate three remote GUI images that can be generated by the portable media device for the WebRadio media player application and displayed on an accessory 1000 according to an embodiment of the present invention.

Accessory 1000 illustrated in FIG. 10A displays a remote GUI image 1002 of a first type on its display 1004. In this instance, the displayed information in remote GUI image 1002 only includes the name of the third-party media player application, e.g., WebRadio, that is currently being executed on the portable media device. In some embodiments, remote GUI image 1002 can be displayed when the third-party application is playing a media item. Remote GUI image 1002 can be suitable for accessories that have minimal display capabilities, e.g., accessories with only a single line of display capability. However, remote GUI image 1002 can also be displayed on accessories with advanced display capabilities if the accessory chooses.

FIG. 10B illustrates a remote GUI image 1006 of a second type. Remote GUI image 1006 displayed by accessory 1020 includes more information about the media item being played by the third-party application than remote GUI image 1002. In this instance, the information in remote GUI image 1006 includes name of the media item 1050, name of the artist 1052, and genre 1054 associated with the media item. As can be seen, remote GUI image 1006 includes more information than remote GUI image 1006.

FIG. 10C illustrates a remote GUI image 1006 of a third type. Remote GUI image 1008 displayed on accessory 1030 includes even more information than remote GUI image 1006. For example, remote GUI image 1008 includes the album artwork, time elapsed, and time remaining information for the media item being currently played. Thus, it can be seen that depending on the accessory, various types of remote GUI images can be displayed by the accessory.

In some embodiments, the accessory can request information about available remote GUI image types for a third-party application from the portable media device, e.g., using the GetPMDOptions command. In some embodiments, the payload of the GetPMDOptions command can include an indication that a list of remote GUI image types is requested for a third-party application and an identifier, e.g., a name or some other unique identifier, associated with the third-party application for which the list of remote GUI image types is being requested. In response to that request, the portable media device can send a list of all available remote GUI image types for the third-party application, e.g., using the RetPMDOptions command. The payload for the RetPMDOptions command in this instance can include a list of available remote GUI image types for the third-party application along with a unique identifier for each remote GUI image type and optionally, a description of each of the remote GUI image types. In some embodiments, the portable media device may have the list of remote GUI image types stored on its local storage medium. In other embodiments, the portable media device may obtain the list of remote GUI image types from an external source, e.g., iTunes® App Store by Apple Inc. or from the third-party application developer.

Once the accessory receives the list of the available remote GUI image types, it can select one of those remote GUI image types and inform the portable media device accordingly, e.g., using the SetPMDOptions command with the unique identifier for the third-party application as the payload. In response to the selection, the portable media device can then generate and send a remote GUI image that conforms to the selected remote GUI image type to the accessory, e.g., using the RemoteGUIImageData command or by sending a video signal. In some embodiments, the accessory manufacturer can specify which remote GUI image type or types are supported by the accessory. Based on this predefined specification, the accessory can select the appropriate remote GUI image type to be requested from the portable media device.

Figure 11:
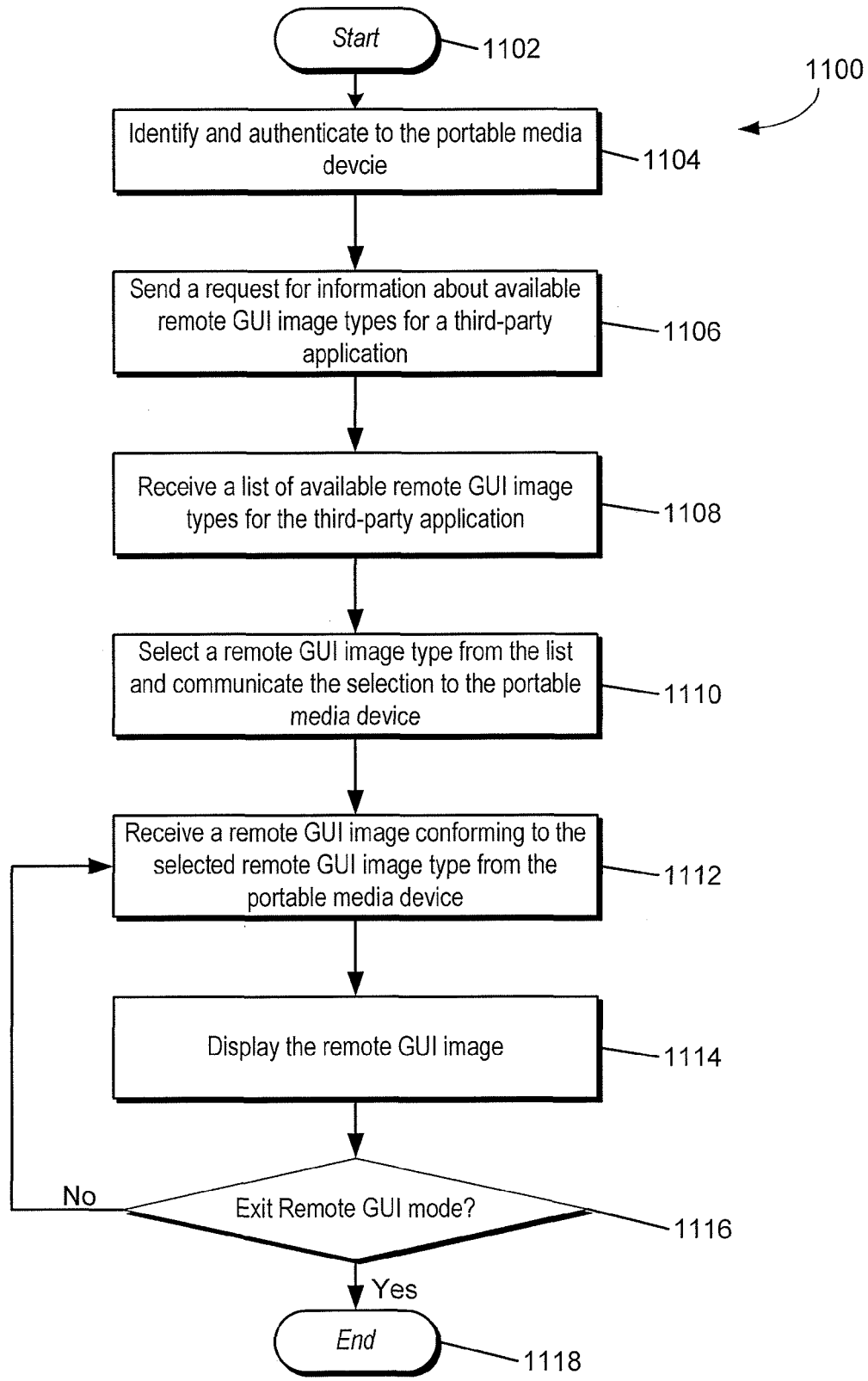
FIG. 11 is a flow diagram of a process that can be used in an accessory for displaying a remote user interface image for a third-party application according to an embodiment of the present invention.

FIG. 11 is flow diagram of a process 1100 for displaying a remote GUI image on an accessory according to an embodiment of the present invention. Process 1100 can be performed, e.g., by accessory 220 of FIG. 2.

Process 1100 starts at block 1102. At block 1104, the accessory can identify and authenticate itself to the portable media device. At block 1106, the accessory can send a request to the portable media device, e.g., using the GetPMDOptions command, requesting the portable media device to send a list of remote GUI image types available for a particular third-party application. In response to the request, the portable media device can send a list of remote GUI image types available for that particular third-party application to the accessory at block 1108. In some embodiments, the portable media device may obtain the list from an external system as described above.

Thereafter, the accessory can select a remote GUI image type from the list and communicate that selection to the portable media device at block 1110. Subsequently, the accessory can receive a remote GUI image that conforms to the selected remote GUI image type from the portable media device at block 1112. The accessory can then display the received remote GUI image on a display at block 1114. At block 1116, the accessory can check whether it wants to exit the remote GUI mode, e.g., based on instructions from a user operating the accessory or disconnection of the accessory from the portable media device. If it is determined that the accessory wants to exit the remote GUI mode, process 1100 can end at block 1118. If it is determined at block 1116 that the accessory is still in the remote GUI mode, process 1100 can return to block 1112 where the accessory receives an updated remote GUI image or keeps receiving a continuous video signal from the portable media device.

It will be appreciated that process 1100 is illustrative and that variations and modifications are possible. Operations described as sequential may be executed in parallel, order of operations may be varied, and operations may be modified, combined, added or omitted. For instance, in one embodiment, the portable media device may provide a list of third-party applications resident on the portable media device to the accessory prior to receiving a request from the accessory for the list of remote GUI image types. Based on that information, the accessory can request a list of available remote GUI image types for one or more third-party applications and store that information in a local storage of the accessory for future use. In some embodiments, the accessory can provide a list of third-party applications that are compatible with the accessory or those that are permitted to be used with the accessory, to the portable media device, e.g., as part of the identification and authentication process. The portable media device can then use this information to determine whether one or more of the compatible/permitted applications are resident on the portable media device and if they are, the portable media device can pre-cache the remote GUI type information for those applications in anticipation of the request from the accessory.

It is to be noted that actions in blocks 1106, 1108, and 1110 can occur whether or not the portable media device is running a third-party application. For example, these actions can also be performed for any native or first-party application that is resident on the portable media device.

Figure 12:
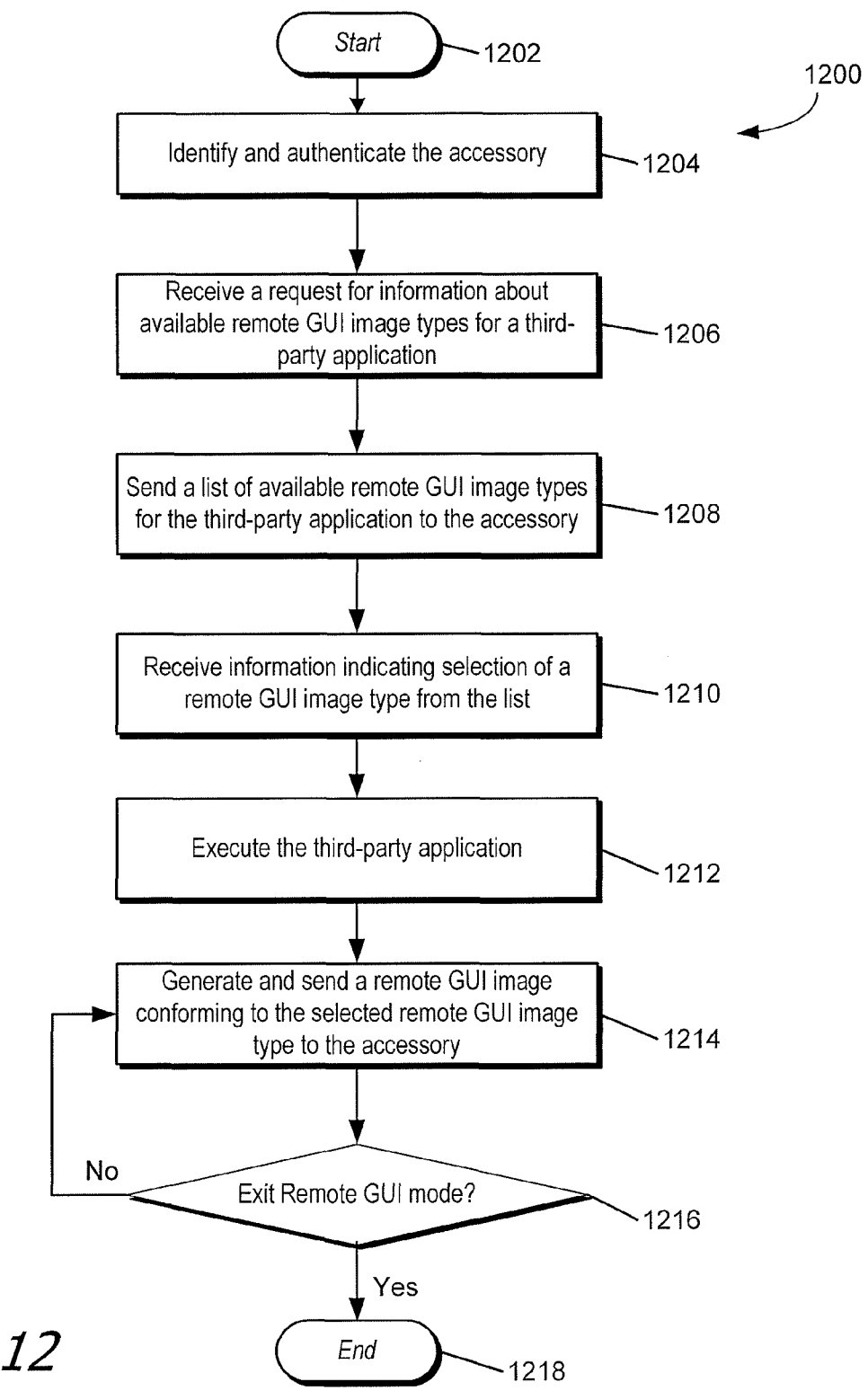
FIG. 12 is a flow diagram of a process that can be used in a portable media device for providing a remote user interface image for a third-party application to an accessory according to an embodiment of the present invention.

FIG. 12 is a flow diagram of a process 1200 according to an embodiment of the present invention. Process 1200 can be performed, e.g., by portable media device 202 of FIG. 2.

Process 1200 starts at block 1202. The portable media device can identify and authenticate the accessory at block 1204. At block 1206, the portable media device can receive a request from an accessory to provide a list of available remote GUI image types for a particular third-party application. As described above, the request can include information about the third-party application for which the list is being requested. Based on the request, the portable media device can determine a list of remote GUI image types and send the list to the accessory at block 1208. Thereafter, the portable media device can receive an indication from the accessory informing the portable media device about which remote GUI image type was selected by the accessory, at block 1210. Once the portable media device receives the selection, the portable media device can then execute the third party application at block 1212. Thereafter, the portable media device can generate and send a remote GUI image that conforms to the selected remote GUI image type to the accessory at block 1214. At block 1216, the portable media device can check whether it has received instructions to exit the remote GUI mode. If yes, process 1200 can then end at block 1218. If the portable media device does not receive instructions to end the remote GUI mode at block 1216, process 1200 can return to block 1214 and the portable media device can keep sending updated remote GUI images or a continuous video signal to the accessory.

It will be appreciated that process 1200 is illustrative and that variations and modifications are possible. Operations described as sequential may be executed in parallel, order of operations may be varied, and operations may be modified, combined, added or omitted. For instance, the accessory can communicate its display capabilities to the portable media device during the authentication and identification process. Based on the display capabilities, the portable media device can include only those remote GUI image types in the list which are compatible with the accessory. Thus, the portable media device can filter out any incompatible remote GUI image types and include only the information for compatible remote GUI image types in the list. For example, consider that the accessory can only display a single line of text. In this instance, the portable media device can exclude information about any remote GUI image type that includes multiple lines of display and only include information about the remote GUI image type(s) that include a single line of display in the list that is sent to the accessory at block 1208. It is to be noted that actions in blocks 1206, 1208, and 1210 can occur whether or not the portable media device is running a third-party application. For example, these actions can also be performed for any native or first-party application that is resident on the portable media device.

As described above, the portable media player can generate and send a remote GUI image associated with a third-party application based on the remote GUI image type selection provided by the accessory. In some embodiments, the accessory can request a remote GUI image that includes specific information. In this instance, the accessory can specify the information items to be included in the remote GUI image. For example, based on the accessory capabilities, the accessory may be able to display more or less information about a media item being played by the third-party application. Some accessories may be capable of displaying all relevant information about a media item while other accessories can have more limited display capabilities. Thus, based on its display capabilities, the accessory can request the portable media device to include certain information items in the remote GUI image. In some embodiments, the accessory may request less information than its capabilities depending on other factors such as safety, aesthetics, etc. In addition, the accessory can also specify other attributes, e.g., non-displayed information, associated with the remote GUI image such as image size, image resolution, location of the displayed information within the image, etc. In some embodiments, the accessory may use a modified SetPMDOptions command to specify the information about the remote GUI image. Upon receipt of this information, the portable media device can generate the remote GUI image based on the specification and send that remote GUI image to the accessory.

In this embodiment, each remote GUI image can be made to "custom fit" the display of the accessory. Also, since each accessory can have different display capabilities, the portable media device need not store or define multiple remote GUI image types for each third-party application. Instead, the portable media device can generate a custom remote GUI image based on the specifications provided by each accessory. As described above, the third-party application provides various data items to the operating system of the portable media device. The portable media device can use the provided data items to construct the remote GUI image. In this manner the remote GUI image can be dynamically generated for each third-party application and for each accessory.

Figure 13:
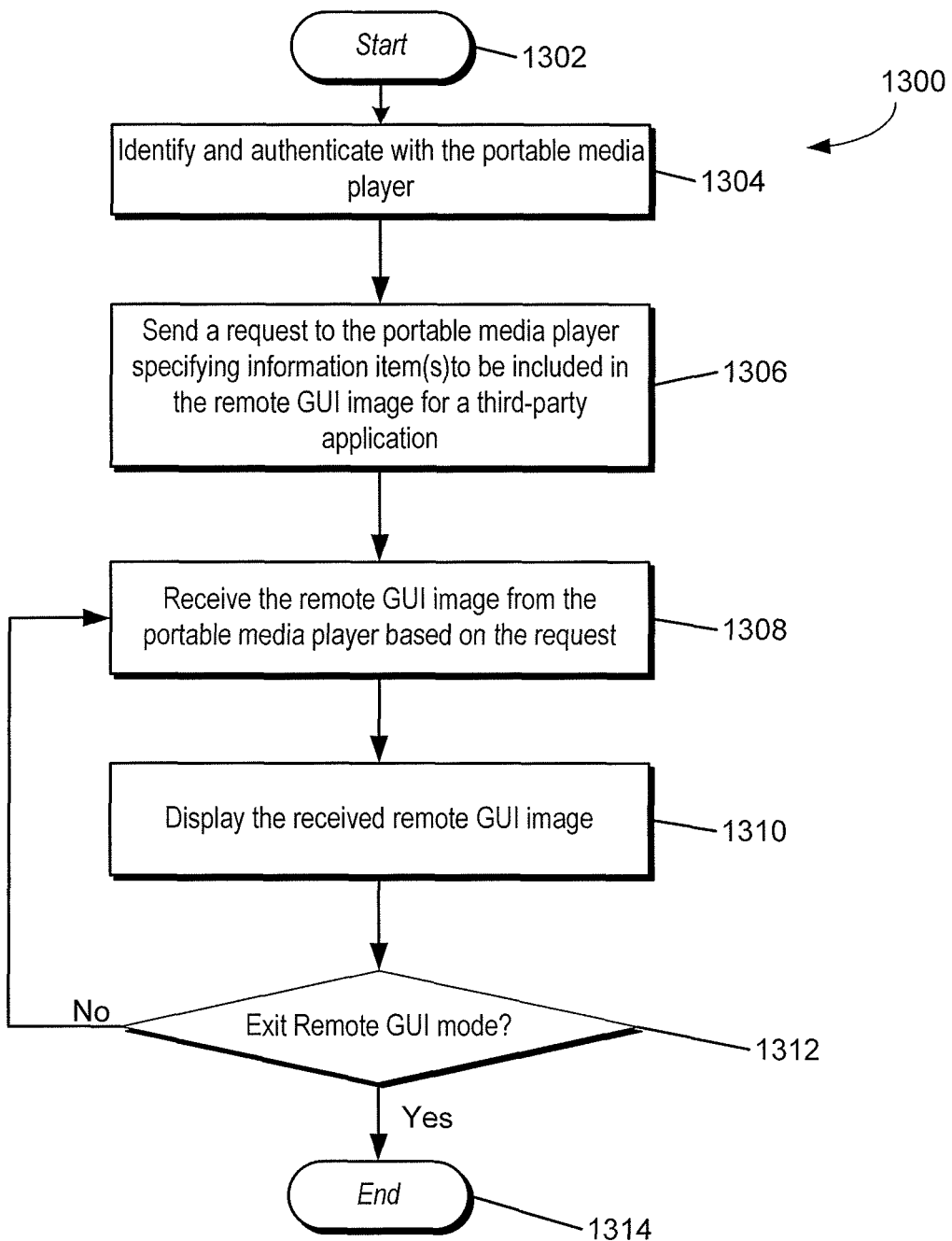
FIG. 13 is a flow diagram of a process that can be used in an accessory for displaying a remote user interface image for a third-party application according to another embodiment of the present invention.

FIG. 13 is a flow diagram of a process 1300 for displaying a remote GUI image according to an embodiment of the present invention. Process 1300 can be performed, e.g., by accessory 220 of FIG. 2.

Process 1300 starts at block 1302. At block 1304, the accessory can identify and authenticate with the portable media device. Thereafter, the accessory can send a request to the portable media device at block 1306. The request can include an indication of the information items to be included in the remote GUI image along with other information about the display capabilities of the accessory. In some embodiments, the information about the display capabilities of the accessory can be separately provided to the portable media device independent of the request in block 1306, e.g., during the authentication process of block 1304. At block 1308, the accessory can receive a remote GUI image based on the information specified in the request. The accessory can display the remote GUI image at block 1310. At block 1312, the accessory can check whether to exit the remote GUI mode. If yes, process 1300 can end at block 1314. If the accessory does not exit the remote GUI mode, process 1300 can return to block 1308 where the accessory receives an updated GUI image or keeps receiving the video signal.

It will be appreciated that process 1300 is illustrative and that variations and modifications are possible. Operations described as sequential may be executed in parallel, order of operations may be varied, and operations may be modified, combined, added or omitted. For instance, In some embodiments, the accessory can start receiving and stop receiving remote GUI images from the portable media device based on explicit instructions to the portable media device, e.g., using commands EnterRemoteGUIMode and ExitRemoteGUIMode, respectively. It is to be noted that actions in blocks 1306, 1308, and 1310 can occur whether or not the portable media device is running a third-party application. For example, these actions can also be performed for any native or first-party application that is resident on the portable media device.

Figure 14:
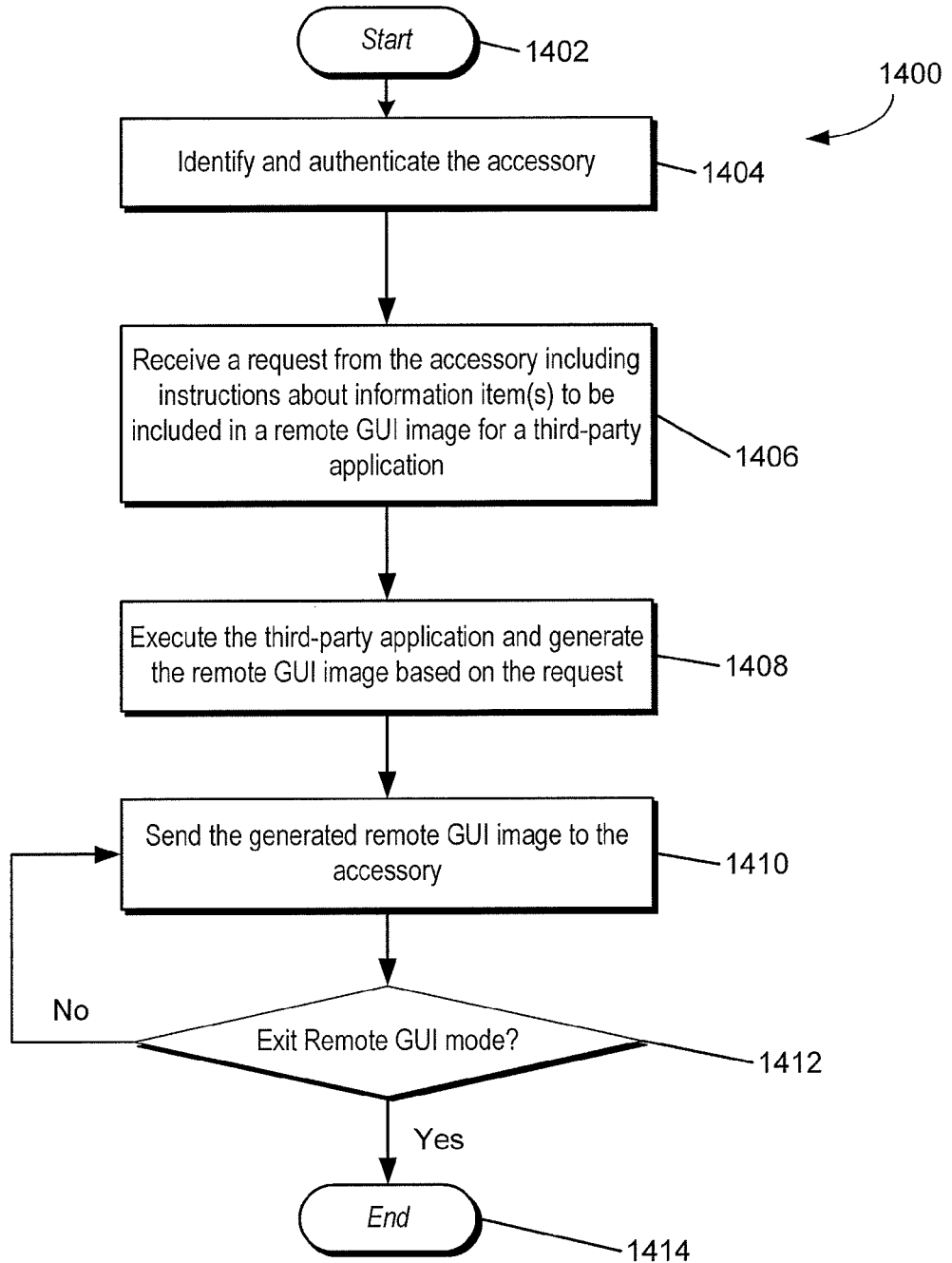
FIG. 14 is a flow diagram of a process that can be used in a portable media device for providing a remote user interface image for a third-party application to an accessory according to another embodiment of the present invention.

FIG. 14 is a flow diagram of a process 1400 for generating a custom remote GUI image according to an embodiment of the present invention. Process 1400 can be performed, e.g., by portable media device 202 of FIG. 2.

Process 1400 begins at block 1402. At block 1404, the portable media device can identify and authenticate an accessory. Thereafter, at block 1406, the portable media device can receive a request from the accessory to generate a remote GUI image for a third-party application. The request can also include specifications for the remote GUI image including but not limited to type and amount of information items to be included in the remote GUI image. At block 1408, the portable media device can execute the third-party application and generate the remote GUI image based on the specification. Once generated, the remote GUI image can be communicated to the accessory at block 1410. At block 1414, the portable media device can check whether it has received instructions to exit the remote GUI mode. If yes, process 1400 can end at block 1414. If no, the portable media device can keep sending updated remote GUI images or the video signal and process 1400 can return to block 1410.

It will be appreciated that process 1400 is illustrative and that variations and modifications are possible. Operations described as sequential may be executed in parallel, order of operations may be varied, and operations may be modified, combined, added or omitted. For instance, at block 1404, the accessory can also send information to the portable media device indicating whether the accessory supports a remote GUI image. In some embodiments, the portable media device can start and stop sending remote GUI images based on explicit instructions from the accessory, e.g., using commands EnterRemoteGUIMode and ExitRemoteGUIMode, respectively. It is to be noted that actions in blocks 1406, 1408, and 1410 can occur whether or not the portable media device is running a third-party application. For example, these actions can also be performed for any native or first-party application that is resident on the portable media device.

In some embodiments, the portable media device may control the remote GUI image of the third-party application based on the operating environment of the accessory. For example, consider that the accessory is an automobile audio/video head unit that is capable of receiving information from the portable media device. In this instance, if the automobile is in motion, the accessory can send environment information, e.g., using the SetEnvInfo command, to the portable media device. Based on this information, the portable media device can send a first remote GUI image to the head unit for a media item that is currently being played by the third-party application. The first remote GUI image can include only information that will not distract the driver. For example, the first remote GUI image may include only the name of the third-party application or only title of the track being currently played. If the automobile is subsequently put in a parked state with the media item still playing, the accessory can send the new environment information to the portable media device. Based on the new environment information, the portable media player can send a second remote GUI image to the accessory for the same media item. The second remote GUI image can include additional information about the media item and can also enable user control inputs, e.g., buttons 116*a-h* of FIG. 1.

In another embodiment, the accessory can dynamically change the remote GUI image type during the operation, e.g., by sending a new SetPMDOptions command, rather than relying on the portable media device to make a decision based on environment information.

Thus, as described above, the portable media device can provide a remote GUI image to the accessory for any third-party application resident on the portable media device. The remote GUI image can include varying amounts of information as specified by the accessory. In addition, if the operating system of the portable media device generates the remote GUI image for multiple first-party and third-party applications, the remote GUI images for the different applications can have a standard look and feel. This makes it easier for a user to read and interact with the remote GUI image.

While the invention has been described with respect to specific embodiments, one skilled in the art will recognize that numerous modifications are possible. For example, although embodiments described above may make specific reference to playback of media content, a portable media device may also provide other functionality such as personal information management, mobile telephony, and so on. In other embodiments, any of this functionality can be made accessible through a remote GUI. Thus, for example, another remote GUI implementation may provide a hands-free telephone interface, e.g., for the driver of an automobile. The driver can operate the remote GUI to answer or place telephone calls, and the call can be conducted using a speaker and microphone controlled by the accessory, together with the mobile phone connection of the PMD. The remote GUI for telephony can resemble the PMD's native GUI for telephony, thus providing the user with a more intuitive interface and potentially reducing distraction related to operating an unfamiliar remote interface.

In addition, embodiments described above may make reference to a portable media device supplying the entire image that is displayed on the accessory. In one alternative embodiment, the remote GUI image supplied by the portable media device can be displayed in a portion of the accessory's display screen while image data from other sources is displayed in other portions of the screen. For example, an accessory may designate a rectangular area within the display device for the remote GUI. The portable media device can deliver pixel data (e.g., in digital or analog form) for the remote GUI area of the display while the accessory determines the pixels for the rest of the display. For example, the accessory can use a portion of the display for displaying navigation information while another portion is used for the remote GUI. For portions of the display not in the remote GUI area, the portable media device can provide placeholder data (e.g., black pixels in an analog video stream) or no data. (If the accessory has a touchscreen as a user input control, the accessory can selectively forward user input signals indicating a touched portion of the screen to the media player based on whether the touched portion is inside or outside the remote GUI area.)

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method for controlling a portable media device using an accessory, the method comprising:
   requesting, by the accessory, from the portable media device, a list of graphical user interface image types available for a third-party application resident on the portable media device;
   receiving, by the accessory, from the portable media device, the list of graphical user interface image types available for the third-party application;
   selecting, by the accessory, a graphical user interface image type, from among the list of graphical user interface image types;

communicating, by the accessory, to the portable media device, the selected graphical user image type from among the list of graphical user interface image types;

receiving, by the accessory, from the portable media device, a graphical user interface image conforming to the selected graphical user interface image type; and displaying, by the accessory, the received graphical user interface image on a display device of the accessory.

2. The method of claim 1 wherein the list of graphical user interface image types include:
   a first graphical user interface image type wherein the displayed information includes only a name of the third-party application; and
   a second graphical user interface image type wherein the displayed information includes one or more metadata items associated with a media item being played by the third-party application.

3. The method of claim 1 wherein selection of the graphical user interface image type is based at least in part on the capabilities of the accessory.

4. The method of claim 1 wherein the accessory is an automobile audio/video system.

5. The method of claim 1 wherein the third-party application is a media player application.

6. A method comprising:
   sending, by an accessory, a request to a portable media device, the request including an indication of one or more information items to be included in a graphical user interface image to be generated for a third-party application resident on the portable media device;
   receiving, by the accessory, the graphical user interface image from the portable media device, the graphical user interface image including the one or more information items requested by the accessory; and
   displaying, by the accessory, the graphical user interface image on a display device of the accessory.

7. The method of claim 6 wherein the one or more information items to be included in the graphical user interface image includes a name of the third-party application but no other information about a media item being played by the third-party application.

8. The method of claim 6 wherein the one or more information items to be included in the graphical user interface image include one or more metadata items associated with a media item being played by the third-party application.

9. A method comprising:
   receiving, by a portable media device, a request from an accessory to provide information about a plurality of graphical user interface image types defined for a third-party application resident on the portable media device;
   sending, by the portable media device, information about the plurality of graphical user interface image types to the accessory;
   receiving, by the portable media device, a response specifying selection of a graphical user interface image type from among the plurality of graphical user interface image types; and
   executing, by the portable media device, the third-party application; and
   during execution of the third-party application, communicating, by the portable media device, a graphical user interface image conforming to the selected graphical user interface image type to the accessory.

10. The method of claim 9 wherein the plurality of graphical user interface image types are predefined by the portable media device.

11. The method of claim 9 wherein the graphical user interface image includes an indication that the third-party application is currently running without any information about a media item being currently played by the third-party application.

12. The method of claim 9 wherein the selected graphical user interface image includes information comprising metadata associated with a media item being played by the third-party application.

\* \* \* \* \*